US012770295B2

(12) United States Patent
Miao et al.

(10) Patent No.: US 12,770,295 B2
(45) Date of Patent: Oct. 20, 2026

(54) SENSOR CALIBRATION

(71) Applicant: NVIDIA Corporation, Santa Clara, CA (US)

(72) Inventors: Hsin Miao, San Francisco, CA (US); Sergei Lupashin, Zurich (CH); Ayon Sen, Santa Clara, CA (US); Yue Wu, Mountain View, CA (US); Gang Pan, Fremont, CA (US); Art Tevs, Oberlunkhofen (CH); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 276 days.

(21) Appl. No.: 18/609,302

(22) Filed: Mar. 19, 2024

(65) Prior Publication Data

US 2025/0299365 A1 Sep. 25, 2025

(51) Int. Cl.
*G06T 7/80* (2017.01)
*G06V 10/44* (2022.01)
*G06V 10/75* (2022.01)

(52) U.S. Cl.
CPC ................ *G06T 7/80* (2017.01); *G06V 10/44* (2022.01); *G06V 10/751* (2022.01)

(58) Field of Classification Search
CPC ......... G06T 7/80; G06V 10/751; G06V 10/44
See application file for complete search history.

(56) References Cited

U.S. PATENT DOCUMENTS 10,645,364 B2 * 5/2020 Kumar ................. H04N 13/246
10,885,698 B2 1/2021 Muthler et al.
(Continued)

FOREIGN PATENT DOCUMENTS

EP 4141482 A1 * 3/2023 ........... G06V 20/584
EP 4439459 A1 * 10/2024 ............ G06T 7/292

OTHER PUBLICATIONS

T. Halperin and M. Werman, "An Epipolar Line from a Single Pixel, " 2018 IEEE Winter Conference on Applications of Computer Vision (WACV), Lake Tahoe, Nv, USA, 2018, pp. 983-991, doi: 10.1109/WACV.2018.00113. (Year: 2018).*
(Continued)

*Primary Examiner* — Delomia L Gilliard
(74) *Attorney, Agent, or Firm* — SHOOK, HARDY & BACON L.L.P.

(57) ABSTRACT

In various examples, epipolar constraint-based cross-camera calibration validation is disclosed. For a pair of cameras that have partially overlapping fields of view, a shared region of their overlapping fields of view may be extracted and used as the basis to perform an epipolar constraint-guided feature descriptor matching process. A camera calibration metric may be computed based on the degree to which a feature descriptor appearing at a pixel of the first image aligns as expected in the second image with an epipolar line associated with the pixel of the first image, where the epipolar line is computed using extrinsic camera calibration parameters associated with the pair of cameras. Epipolar matching may be performed for a plurality of feature points and an aggregate validation score computed based on measuring the computed deviations for each feature. A sensitivity analysis may be applied to better assess the usefulness of the validation score.

20 Claims, 16 Drawing Sheets

(56) References Cited

U.S. PATENT DOCUMENTS

| | | | | |
|---|---|---|---|---|
| 11,144,754 | B2 | 10/2021 | Hu et al. | |
| 11,158,026 | B1 * | 10/2021 | Kamal | H04N 13/239 |
| 11,644,834 | B2 * | 5/2023 | Ditty | B60W 60/0015<br>701/23 |
| 12,437,548 | B1 * | 10/2025 | Dowdall | G06V 20/56 |
| 2004/0240725 | A1 * | 12/2004 | Xu | G06V 10/24<br>382/154 |
| 2017/0008521 | A1 * | 1/2017 | Braunstein | G01C 21/30 |
| 2018/0336704 | A1 * | 11/2018 | Javan Roshtkhari | G06T 7/80 |
| 2019/0028688 | A1 * | 1/2019 | Kumar | H04N 13/246 |
| 2020/0053338 | A1 * | 2/2020 | Hwang | G06T 3/18 |
| 2021/0365781 | A1 * | 11/2021 | Zhang | G06N 3/08 |
| 2023/0007234 | A1 * | 1/2023 | Yautz | G06T 7/0002 |
| 2023/0141515 | A1 * | 5/2023 | Danziger | H04N 13/122<br>348/47 |
| 2023/0145561 | A1 | 5/2023 | Miao et al. | |
| 2023/0401745 | A1 * | 12/2023 | Kothari | B60W 60/00 |
| 2024/0089601 | A1 * | 3/2024 | Kumar | G06V 10/44 |
| 2024/0098245 | A1 * | 3/2024 | Adams | G06T 7/80 |
| 2025/0095318 | A1 * | 3/2025 | Taheri | G06T 7/74 |
| 2025/0299365 | A1 * | 9/2025 | Miao | G06T 7/85 |

OTHER PUBLICATIONS

S. Gurbuz, M. Kawakita and H. Ando, “Color calibration for multi-camera imaging systems,” 2010 4th International Universal Communication Symposium, Beijing, China, 2010, pp. 201-206, doi: 10.1109/IUCS.2010.5666228. (Year: 2010).*

“Taxonomy and Definitions for Terms Related to Driving Automation Systems for On-Road Motor Vehicles”, National Highway Traffic Safety Administration (NHTSA), A Division of the US Department of Transportation, and the Society of Automotive Engineers (SAE), Standard No. J3016-201609, pp. 1-30 (Sep. 30, 2016).

“Taxonomy and Definitions for Terms Related to Driving Automation Systems for On-Road Motor Vehicles”, National Highway Traffic Safety Administration (NHTSA), A Division of the US Department of Transportation, and the Society of Automotive Engineers (SAE), Standard No. J3016-201806, pp. 1-35 (Jun. 15, 2018).

’ISO 26262, “Road vehicle—Functional safety,” International standard for functional safety of electronic system, Retrieved from Internet URL: https://en.wikipedia.org/wiki/ISO_26262, accessed on Sep. 13, 2021, 8 pages.

IEC 61508, “Functional Safety of Electrical/Electronic/Programmable Electronic Safety-related Systems,” Retrieved from Internet URL: https://en.wikipedia.org/wiki/IEC_61508, accessed on Apr. 1, 2022, 7 pages.

Rublee et al., “ORB: An Efficient Alternative to SIFT or SURF”, IEEE International Conference on Computer Vision, Nov. 2011, 8 pages.

U.S. Appl. No. 18/349,779, Title : Camera Calibration for Autonomous Systems and Applications, Filed on Jul. 10, 2023, 88 pages.

* cited by examiner

SENSOR CALIBRATION

BACKGROUND

Advanced Driver Assistance Systems (ADASs) may use vehicle camera image data from multiple cameras to provide functionalities such as lane-departure warnings, blind-spot monitoring, autonomous lane changing, collision avoidance, parking assistance, and/or other autonomous or semi-autonomous driving capabilities. Image data may comprise a fusion of image data captured by different cameras that are configured with different lens types to produce diverse fields of view such as fisheye cameras, wide-angle cameras, and/or telephoto cameras, for example. Using such image data, on-board systems can generate a computer vision-based three-dimensional (3D) perception of the 3D environment around the vehicle in order, for example, to determine how to control the vehicle within the environment and/or implement ADAS type features.

SUMMARY

Embodiments of the present disclosure relate to epipolar constraint-based cross-camera calibration validation. Systems and methods are disclosed that provide techniques for validating calibration parameters that match views between different vehicle cameras to ensure that on-board generated three-dimensional (3D) computer vision-based perception accurately reflects a 3D environment around the vehicle, and/or that machine vision perception is able to correctly map observed objects to 3D ray locations relative to the vehicle.

In contrast to presently available vehicle camera calibration technologies, the systems and methods presented in this disclosure provide a process that may be executed using the on-board vehicle resources to generate an indication of whether a current set of camera calibration parameters are at least sufficiently accurate to satisfy a validation criteria. For a pair of vehicle cameras that have at least a partially overlapping field of view, a cross-camera view alignment may be performed. Using a pair of image frames substantially simultaneously captured by each camera, a shared region of their overlapping field of view may be extracted and used as the basis to perform an epipolar constraint-guided feature descriptor matching process. For a given feature appearing in both images, the matching of its feature descriptors is constrained by epipolar lines that describes the relationship between the fields of view of the two cameras. A camera calibration metric may be computed based on the degree to which the feature descriptor appearing at a pixel of the first image aligns as expected in the second image with the epipolar line associated with the pixel of the first image. Such epipolar constraint-guided feature descriptor matching may be performed between the images as one feature, or a plurality of features (e.g., thousands of feature points) and an aggregate validation score computed based on measuring the computed alignments for each feature. If a validation score meets a validation criteria then an output may be generated indicating that the calibration between the camera pair passes the validation test. If the validation score does not meet the validation criteria, then an output may be generated indicating that the calibration between the camera pair does not pass the validation test. In some embodiments, a sensitivity analysis may be applied to validation scores to better assess the usefulness of the validation score.

BRIEF DESCRIPTION OF THE DRAWINGS

The present systems and methods for epipolar constraint-based cross-camera calibration validation are described in detail below with reference to the attached drawing figures, wherein.

DETAILED DESCRIPTION

Figure 1:
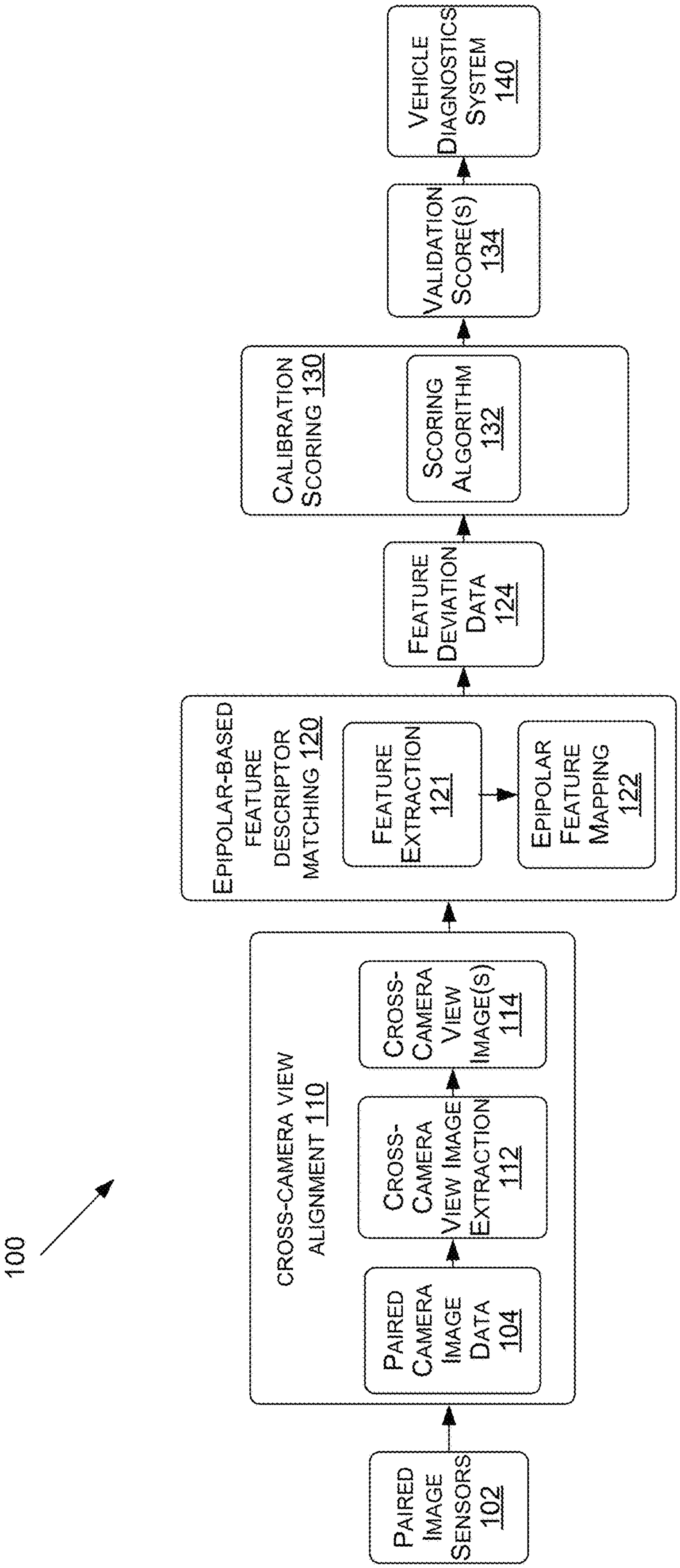
FIG. 1 is a data flow diagram for an example camera calibration validation system, in accordance with some embodiments of the present disclosure.

Systems and methods are disclosed related to epipolar constraint-based cross-camera calibration validation. Although the present disclosure may be described with respect to an example autonomous or semi-autonomous vehicle or machine 700 (alternatively referred to herein as "vehicle 700" or "ego machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to camera calibration validation for ADAS-equipped vehicles, this is not intended to be limiting, and the systems and methods described herein may be used in augmented reality, virtual reality, mixed reality, robotics, security and surveillance, autonomous or semi-autonomous machine applications, and/or any other technology spaces where camera calibration validation may be used.

The present disclosure relates to vehicle camera calibration technologies. More specifically, the systems and methods presented in this disclosure provide techniques for validating calibration parameters that match views between different vehicle cameras to ensure that on-board generated three-dimensional (3D) computer vision-based perception accurately reflects a 3D environment around the vehicle, and/or that machine vision perception is able to correctly map observed objects to 3D ray locations relative to the vehicle.

Optical image sensors, such as vehicle cameras, capture an image of a 3D scene as a two-dimensional (2D) image frame. Parameters that influence how the 3D scene around the vehicle appears when projected onto the 2D coordinate space of an image frame include extrinsic and/or intrinsic parameters. Intrinsic parameters may refer to factors that describe optical image sensor device optics, such as optical center (also known as the principal point), focal length, skew coefficient, and/or field of view. Intrinsic parameters for a sensor are relatively static and may be determined based on fabrication specifications and/or factory calibrations. Extrinsic parameters may refer to factors that describe the physical orientation of the optical image sensor device, such as rotation (e.g., roll and tilt parameters), translation, and location relative to a machine and/or ground surface. The intrinsic parameters of an image sensor are either inherent to the device or can be established during manufacture, and are expected to remain stable. In contrast, the extrinsic parameters of location, rotation, and translation depend on how the camera is mounted and oriented with respect to the vehicle's frame and can experience drift, for example, caused by vibrations and/or thermal cycling often experienced by vehicles.

Both extrinsic and intrinsic calibration parameters of an optical image sensor play a part in how features in the 3D environment will appear within the 2D image frame captured by the sensor. When calibration parameters for two or more cameras have been accurately established and remain true, features appearing within a field of view of an image frame captured by a first camera can be predictably mapped to a field of view of an image frame captured by a second camera using a rotation-translation (RT) transform (e.g., a transformation matrix) that describes the extrinsic relationship between the two cameras. Three-dimensional reconstructions based on epipolar geometry may then be used to produce a computer visualization based on the image data from those cameras. If the calibration parameters drift over time, or were not accurately established to begin with, then that mis-calibration adversely affects the accuracy of the mapping between image frames provided using the RT transform. As a result, 3D computer visualizations and/or a 3D machine vision perception generated from the fusion of the image data from these two cameras using 3D reconstruction may include inaccuracies and/or ambiguities that hinder accurately computing the 3D position of objects within the visualization and/or correlating position of objects in the visualization with the position of real-life objects in the vicinity of the vehicle (e.g., a distance of the real-life object from the vehicle). Accordingly, to achieve the accurate perception from camera fusion results, camera calibrations are performed between cameras that contribute image data to the ADAS systems.

Initial calibration procedures to establish vehicle camera calibration parameters are typically performed at a vehicle factory or service workshop facility using one or more calibration targets that are positioned within the field of view of two or more vehicle cameras. The calibration targets are positioned relative to the vehicle at known coordinates and/or distances as images are taken using the on-vehicle cameras. The camera calibration parameters for the set of vehicle cameras may then be computed using the images of the calibration targets and using calibration algorithms to compute the calibration parameters (e.g., RT transformation matrixes) that map the location of calibration targets between image frames of the cameras. The initial calibration process thus involves bringing the vehicle into a properly equipped and configured testing facility and calibrating one vehicle at a time. While such a process may yield a proper initial calibration, it is time, labor, and resource intensive and does not provide a scalable solution for the purpose of subsequently validating whether a vehicle's calibration parameters remain correct over time.

One proposed method for validating camera calibrations outside of specialized factory facilities is performed by collecting LIDAR point cloud data from a vehicle's surroundings while the vehicle is moving. The depth data for objects derived from the LIDAR point cloud may then be correlated with computed positions of the object based on vehicle camera images to determine the current accuracy of the vehicle camera calibrations. However, this method depends on LIDAR point cloud data and is therefore not readily adapted to common ADAS systems, which do not typically include LIDAR sensors. Moreover, in most practical LIDAR configurations, the point cloud data used in this method would be accumulated by driving the vehicle over a length of roadway and collecting the data as the vehicle is moving. Presently, there is a deficiency in the availability of techniques for validating camera calibration outside of these full factory calibration procedures using on-board vehicle resources with the vehicle remaining stationary during the process or when a LIDAR or other direct feature distance measurement is not available.

In contrast to presently available vehicle camera calibration technologies, the systems and methods presented in this disclosure provide a process that may be executed using the on-board vehicle resources to generate an indication of whether a current set of camera calibration parameters are at least sufficiently accurate to satisfy a validation criteria. More specifically, for a pair of vehicle cameras that have at least a partially overlapping field of view, a cross-camera view alignment may be performed. Using a pair of image frames simultaneously captured by each camera, a shared region of their overlapping field of view may be extracted and used as the basis to perform an epipolar constraint-guided feature descriptor matching process. In that process, a feature commonly appearing in both image frames may be used to perform feature descriptor matching to try to associate (e.g., match) one or more feature points between the two views represented by the pair of image frames. For a given feature appearing in both images, the matching of its feature descriptors is constrained by epipolar lines that describes the relationship between the fields of view of the two cameras. Notably, in some embodiments directly measured and/or indirectly estimated information about the distance of the features to the camera is not required. A camera calibration metric may be computed based on the degree to which the feature descriptor appearing at a pixel of the first image aligns as expected in the second image with the epipolar line associated with the pixel of the first image. Such epipolar constraint-guided feature descriptor matching may be performed between the images using one feature, or a plurality of features (e.g., thousands of feature points), and an aggregate validation score computed based on measuring the computed alignments for each feature. In some embodiments, if the validation score meets a validation criteria, then an output may be generated indicating that the calibration between the camera pair passes the validation test. If the validation score does not meet the validation criteria, then an output may be generated indicating that the calibration between the camera pair fails the validation test.

With respect to the cross-camera view alignment, in some embodiments this alignment may be implemented by a cross-camera view alignment function that inputs a pair of image frames (e.g., paired camera image data) simultaneously captured by a pair of cameras that share an overlapping field of view. For many applications, the cameras may have different focal lengths so that the images captured by the cameras will have different angles of view (e.g., a camera comprising a fisheye lens may produce image frames with a 200-degree angle of view, while a camera comprising a standard lens may produce image frames with a 30-, 70- and/or 120-degree angle, for example). A feature appearing in an image frame captured by a first camera of the pair may therefore be presented at a different scale, as well as different orientation, in an image frame captured by the second camera. In some embodiments, the cross-camera view alignment function performs an image extraction from one or both of the images to obtain a pair of cross-camera view images. For example, in some embodiments, the cross-camera view alignment function may extract a central 30-degree angle of view region of the first image and the corresponding 30-degree angle of view region from the second image and align those cross-camera view images with each other. One or both of the resulting cross-camera view images may be further filtered or processed to correct for distortions (e.g., a barrel distortion) or other image warping applied to increase the similarity of appearance of features within the images. Based on the resulting pair of cross-camera view images, epipolar constraint-guided feature descriptor matching may be performed.

With respect to the epipolar constraint-guided feature descriptor matching, in some embodiments this feature descriptor matching may be implemented by an epipolar-based feature descriptor matching function that inputs the pair of cross-camera view images produced by the cross-camera view alignment function. The epipolar-based feature descriptor matching function may extract a set of feature points from each cross-camera view image and use at least one feature descriptor to match the feature points between two view images.

Epipolar geometry is the field of geometry that describes, e.g., stereo vision-when two cameras view a 3D scene from distinct positions. Epipolar geometry describes the geometric relationships between the points on a 3D object captured by a pair of cameras, and the projection of those points onto the two 2D image frames captured by each camera, that result in constraints between the image points and their appearance in the two 2D image frames. For example, considering the first camera of the pair of cameras, a line of points that are aligned with each other in a ray that extends from the camera's optical center may all project onto the same common point (e.g., pixel) on the sensor of the first camera. From the viewpoint of the second camera, the points on that same line do not all project onto the same point on the sensor of the second camera, but instead the points of that ray project onto separate points on the sensor of the second camera to form a line. That line appearing in the image of the second camera may be referred to as the epipolar line associated with the common point (e.g., pixel) on the sensor of the first camera. In this way, for each pixel of the first image from the pair of cross-camera view images, there is an associated epipolar line in the second image of that pair. Similarly, for each pixel of the second image from the pair of cross-camera view images, there is an associated epipolar line in the first image from that pair. This relationship between pixels and their respective epipolar line is referred to as epipolar constraint. It should be noted that due to lean distortion such as barrel distortion, the epipolar lines referred to herein may often actually appear as curves in unrectified images.

Moreover, the location and orientation of a pixels projection onto its epipolar line is at least in part a function of the extrinsic relationship (rotation and translation) between the two cameras, which is the relationship captured by their respective extrinsic calibration parameters. As such, if the extrinsic calibration parameters for the pair of cameras are correct, then using the RT transformation matrix computed from the extrinsic calibration parameters, a feature appearing at a first pixel in the first view image will appear on a first epipolar line associated with the first pixel in the second view image. Similarly, a feature appearing at a second pixel in the first view image will appear on a second epipolar line associated with the second pixel in the second view image. If the features at the first image pixels deviate and do not appear where expected on the epipolar lines of the second image, then that means that the RT transformation matrix no longer accurately represents the present true extrinsic relationship between the first and second cameras of that pair. The amounts of deviation for each matched feature descriptor can be computed and input to a statistical algorithm to compute a calibration validation score for that pairing of vehicle cameras.

In some embodiments, feature points used for performing the epipolar constraint-guided feature descriptor matching may be extracted from the pair of cross-camera view images using a feature extraction algorithm and/or model. For example, the feature extraction algorithm may detect a feature from an image and extract readily discernable feature points for that feature (e.g., feature points located at the corners of an object). For example, in some embodiments, a feature extraction algorithm (e.g., Oriented FAST and rotated BRIEF (ORB)) may be applied to the pair of cross-camera view images to identify feature points from features appearing in the images, and extract feature descriptors from those features points. Features from Accelerated Segment Test (FAST) may be used, for example, as a corner detection algorithm. FAST detects corners on an input image, returning their coordinates. These corners can then be used as feature key points for tracking in a computationally efficient manner. Binary robust independent elementary feature (BRIEF) may be used to convert key points detected by the FAST algorithm into a binary feature vector representation of an object.

In some embodiments, a feature descriptor for a feature point may comprise a vector representation of one or more local characteristics of the feature point (e.g., luminance, orientation, etc.) for a patch around the feature point. The epipolar-based feature descriptor matching function may further include an epipolar feature mapping algorithm that inputs the feature points from the cross-camera view image pairs produced by the feature extraction algorithm. For a given feature point in one of the cross-camera view image pairs, its feature descriptor (e.g., the vector) may be used to identify (e.g., map) the location of the corresponding feature point in the other of the cross-camera view image pairs based on similarity of feature descriptors, and thus match the feature point between the two cross-camera view images. Moreover, by checking a perturbed feature point, a local orientation mapping can also be calculated, further improving the matching quality of feature descriptors when orientation information matches, such as in the ORB descriptor.

As discussed above, a feature point as observed from the first image may be projected onto a pixel of the first camera's sensor. For that pixel of the first camera, an epipolar line may be computed and applied to the second image (where the epipolar line is computed based on the RT transform computed from the extrinsic calibration parameters for that camera pair). If the RT transform based on the extrinsic calibration parameters remains accurate and free from drift (that is, the extrinsic calibration parameters determined during the initial calibration still accurately represent the rotation and translation characteristics of the two cameras), then the location of the feature point in the second image (matched from the feature point in the first image) should rest on the computed epipolar line.

Deviation of the location of the matched feature point from the computed epipolar line indicates that the rotation and translation characteristics of at least one of the two cameras (and possibly of both cameras) has changed since the extrinsic calibration parameters were determined at the initial calibration. The amount of deviation may directly indicate how far off the extrinsic calibration parameters are from representing the current relative extrinsic parameter state (rotation and translation) between the two cameras. For some applications, a small amount of deviation may be less than an established threshold (e.g., validation criteria) and still provide enough accuracy to generate 3D reconstructions and/or computer visualizations to support accurate computer vision-based perception functions. Alternatively, larger deviations that exceed an established threshold (e.g., validation criteria) may degrade the quality of 3D reconstructions and/or computer visualizations. In some embodiments, when deviations exceeding a validation criteria are detected, one or more actions may be triggered such as, but not limited to, displaying a warning to the vehicle operator, adjusting the operation of one or more vehicle control systems, and/or reporting the condition to a cloud-based monitoring or telemetry system.

With respect to the camera calibration metric, in some embodiments the validation score may be computed by a camera calibration scoring function, using as input a set of deviation data from the epipolar-based feature descriptor matching function. In essence, the validation score represents how well matched feature descriptors align as expected with an epipolar line. In some embodiments, the validation score for a pair of cameras may be computed by an algorithm based on deviation data for a set of one or more (e.g., thousands) of feature points computed from a pair of cross-camera view images. The individual deviations computed for each respective feature point may be aggregated to compute an overall validation score for the pair of cameras. Feature descriptor likeness may also be used to further weigh the contribution of individual deviations and enhance the aggregate validation score quality. In some embodiments, the validation scores for a pair of cameras may be computed over a series of images captured over time. The individual validation scores may then be aggregated, averaged, and/or applied to one or more statistical algorithms to produce a running validation score and/or to track changes in the validation score over time. In some embodiments, the frequency in how often validation scores are computed for a pair of cameras may be increased based on the deviation data. In some embodiments, the validation scores may be used to estimate one or more key performance indicators (KPIs) used to indicate the health status of vehicle cameras.

In some embodiments, a given camera may be included in different pairings with other cameras to produce validation scores that more comprehensively represent the calibration quality for a set of vehicle cameras and/or to better narrow down calibration parameter problems to a single camera rather than just to a pair of cameras. For example, for a set of vehicle cameras that includes three cameras, a first pair may comprise cameras one and two, a second pair may comprise cameras two and three, and a third pair may comprise cameras three and one. A validation score may be computed for each of the first, second, and third camera pair, as discussed herein. If the validation score for the first camera pair satisfies the validation criteria, but the validation scores for the second camera pair and third camera pair do not satisfy the validation criteria, these validation scores when considered together point to a potential calibration issue with camera three. That is, the failing validation scores are both for camera pairs that include camera three, whereas the validation score for the first camera pair that does not include camera three passes the validation criteria. Based on these results, the cause of the calibration anomalies in this set of cameras can be isolated to the third camera.

In some embodiments, a sensitivity analysis may be applied to validation scores to better assess the usefulness of the validation score. As an example, depending on environmental conditions or the nature of the scene surrounding the vehicle, the capacity of the epipolar-based feature descriptor matching function to detect a feature and extract readily discernable feature points from an image, and locate a matching feature point based on feature descriptors in the second image, may be adversely affected. In some embodiments, a camera calibration scoring function may compute one or more sensitivity metrics based at least on a sensitivity analysis that perturbs the extrinsic calibration parameters that are used in the process of computing the validation score. For example, a perturbation of the extrinsic calibration parameters may add a bias of +/−0.1 degree to the rotation angles and/or a small bias to the translation values of the parameters—with validation scores recomputed at each perturbation. In some embodiments, the sensitivity analysis may sweep across a range of rotation and/or translation perturbations and recompute validation scores using the same image pair, and may be used to compute the initial/base validation score. If the validation score does not change substantially in response to the perturbations of the extrinsic calibration parameters, that indicates that the validation score is largely insensitive to change in that parameter and likely represents a poor indication on the extrinsic parameter state of that camera pair. In contrast, if the validation score does change substantially in response to the perturbations of the extrinsic calibration parameters, that indicates that the validation score is sensitive to a change in those parameters and is potentially an accurate indication of the extrinsic parameter state of that camera pair.

In some embodiments, the sensitivity analysis may be used to produce a validation score sensitivity map corresponding to the pair of cross-camera view images. For example, the validation score sensitivity map may illustrate how the validation score reacts to a range of rotation and/or translation perturbation sweeps. Changes in the validation score as a function of perturbation magnitudes from the validation score sensitivity map may be fit to curves (e.g., parabolas) representing validation score sensitivity. In some embodiments, the validation score sensitivity map and/or curves derived from the map, may be input to a machine learning model trained as a classification model. That is, based on an input computed by the sensitivity analysis, the machine learning model is trained to predict whether a camera pair should be classified as within calibration tolerance (e.g., a passing extrinsic calibration state) or not within calibration tolerance (e.g., a non-passing extrinsic calibration state). In some embodiments, validation score sensitivity maps and/or curves from a plurality of different camera pairs may be processed by the machine learning model to generate predictions that may isolate calibration anomalies to specific cameras, for example based on evaluating classification productions for separate camera pairs as discussed above. Based on the classification predictions, one or more actions may be triggered such as, but not limited to, displaying a warning to the vehicle operator, adjusting the operation of one or more vehicle control systems, and/or reporting the condition to a cloud-based monitoring or telemetry system.

It should be appreciated that the embodiments described herein may be used in the context of computer-based visualization and perception systems for machines including, but not limited to, ego machines and ego vehicles such as automobiles, trucks, trains, aircraft, spacecraft, and/or boats, and may be extended to other machinery such as remotely operated and/or autonomous devices (e.g., robots and drones), and other industrial and/or construction machinery.

With reference to FIG. 1, FIG. 1 is an example data flow diagram for a calibration validation system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by one or more processors (e.g., processing units, processing circuitry) executing instructions stored in memory. In some embodiments, the systems, methods, and processes described herein may be executed using similar components, features, and/or functionalities to those of example autonomous or semi-autonomous vehicle or machine 700 of FIGS. 7A-7D, example computing device 800 of FIG. 8, and/or example data center 900 of FIG. 9.

As shown in FIG. 1, the calibration validation system 100 may receive image data from a set of one or more paired image sensors 102 and compute a camera calibration metric in the form of one or more validation scores 134. The one or more validation scores 134 provide an indication of whether a current set of extrinsic camera calibration parameters associated with the paired image sensors 102 are at least sufficiently accurate to satisfy a validation criteria. The paired image sensors 102 may comprise optical image sensors of the vehicle 700 that capture images of the exterior 3D scene around the vehicle 700 as two-dimensional (2D) image frames. The paired image sensors 102 may comprise, for example, any pairing of the image sensors as described with respect to FIGS. 7A-7D, and/or other image sensors that have at least a partially overlapping field of view. As discussed herein, a set of paired image sensors 102 may have the same focal lengths providing the same angle of view, or may have different focal lengths so that the respective images captured by each of the cameras may have different angles of view. For example, in some embodiments, a first image sensor of the paired image sensors 102 may comprise a wide-angle and/or fisheye lens, while the second image sensor of the paired image sensors 102 may comprise a standard or telephoto lens.

As shown in FIG. 1, the image data from the paired image sensors 102 may be input into a cross-camera view alignment function 110. The paired camera image data 104 may comprise a pair of image frames simultaneously captured by a set of the paired image sensors 102. Using the paired camera image data 104, a shared region of their overlapping field of view may be extracted and used as the basis to perform an epipolar constraint-guided feature descriptor matching process. In some embodiments, the cross-camera view alignment function 110 comprises a cross-camera view image extraction function 112 that may perform an image extraction from one or both of the images of paired camera image data 104 to obtain a pair of cross-camera view images 114. The cross-camera view image extraction function 112 may extract a pair of cross-camera view images 114 that comprise image features that are overlapping features appearing in image frames from both of the paired image sensors 102 in the paired camera image data 104.

Figure 3A:
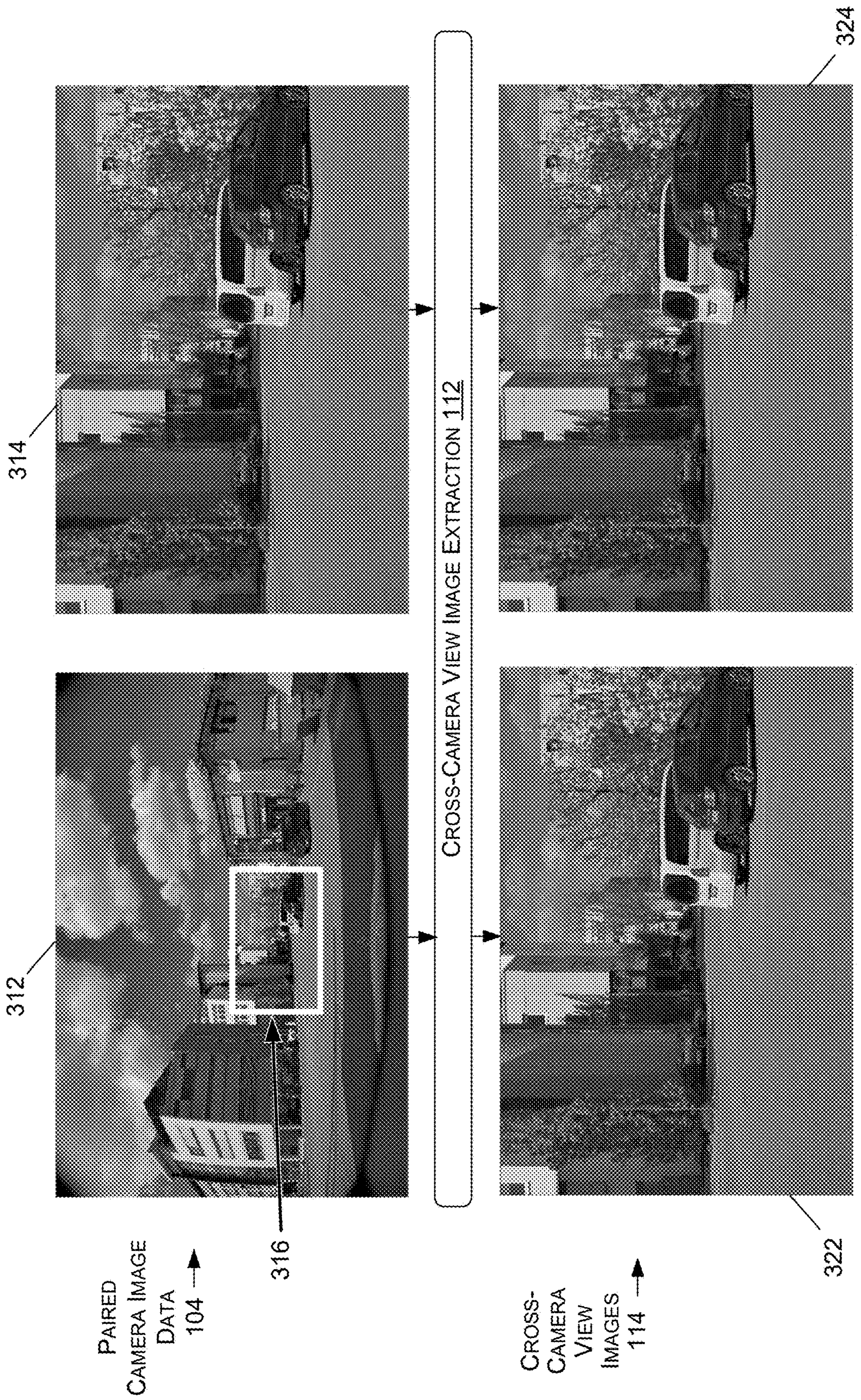
FIGS. 3A-3C are diagrams illustrating an example of processing of cross-camera view images using epipolar-based feature descriptor matching to generate epipolar deviation data, in accordance with some embodiments of the present disclosure.

For example, referring to FIG. 3A, FIG. 3A illustrates the operation of a cross-camera view image extraction function 112 that generates a pair of cross-camera view images 114 from paired camera image data 104. In this example, the first image frame 312 produced by a first camera of the paired image sensors 102 has a wider field of view than the second image frame 314 produced by a second camera of the paired image sensors 102. The cross-camera view image extraction function 112 inputs the first image frame 312 from the paired camera image data 104, and inputs the second image frame 314 from the paired camera image data 104. The first image frame 312 captures a wider angle view than the second image frame 314, but both of the paired image sensors 102 in this example are generally oriented in the same direction so that the features appearing in the second image frame 314 are also completely within the first image frame 312. Here, a region 316 of the first image frame 312 represents a shared region of the cameras' overlapping fields of view. This shared region 316 may be detected and extracted by the cross-camera view image extraction function 112 to generate the pair of cross-camera view images 114 shown at 322 and 324. In this example, the cross-camera view image 324 may comprise the same field of view as the second image frame 314, while the cross-camera view image 322 comprises a field of view corresponding to the shared region 316 extracted from the first image frame 312.

Figure 4A:
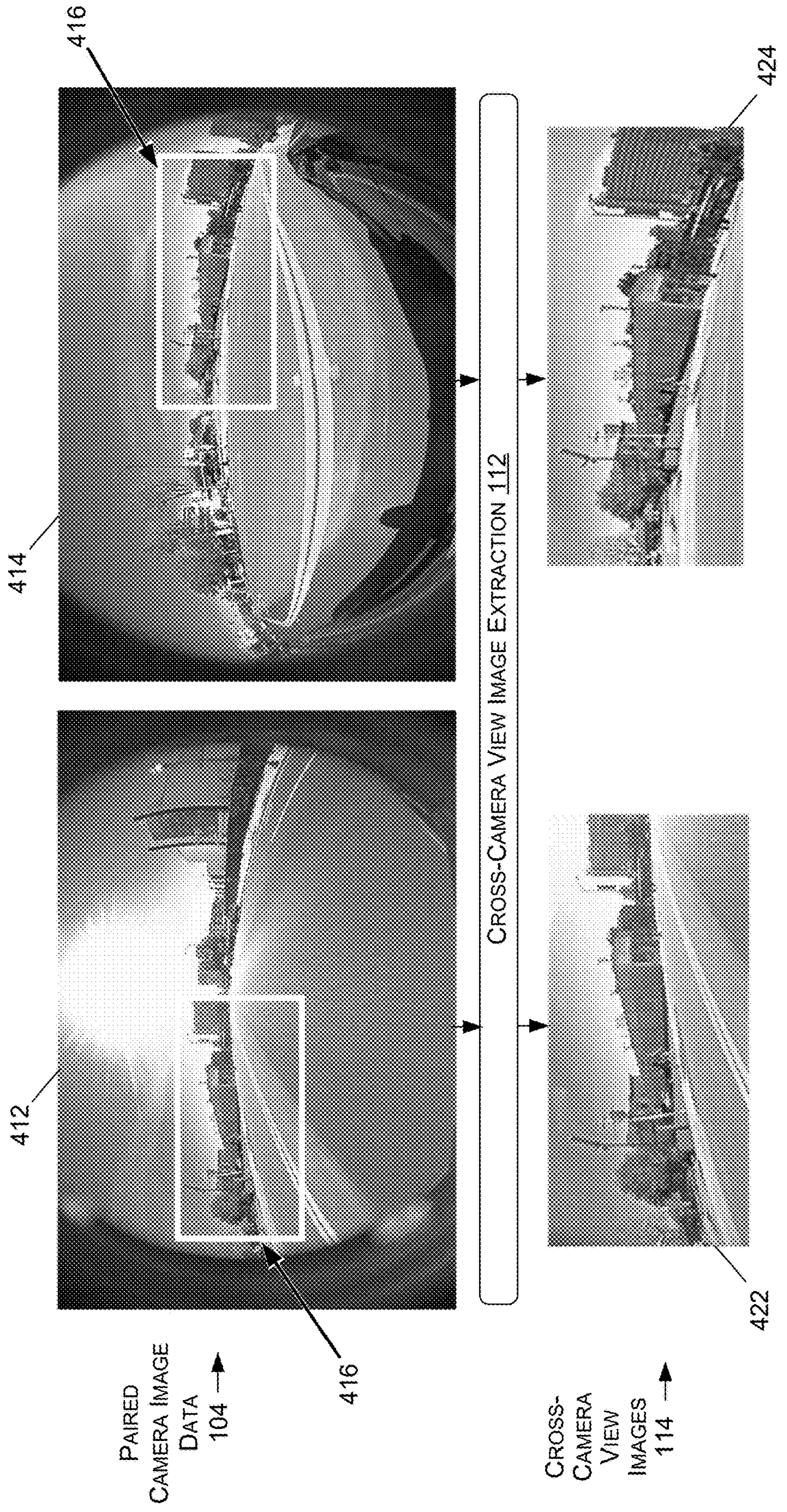
FIGS. 4A-4B are diagrams illustrating another example of processing of cross-camera view images using epipolar-based feature descriptor matching to generate epipolar deviation data, in accordance with some embodiments of the present disclosure.

FIG. 4A provides another example that illustrates where the cross-camera view image extraction function 112 generates a pair of cross-camera view images 114 from paired camera image data 104. In this example, both cameras of the paired image sensors 102 are fisheye cameras, and each has a field of view that only partially overlaps with the other. The cross-camera view image extraction function 112 inputs a first image frame 412 from the paired camera image data 104, and inputs a second image frame 414 from the paired camera image data 104. The first image frame 412 captures a fisheye view directed in the direction of travel of the vehicle 700 while the second image frame 414 also captures a fisheye view of the scene on the left side of the vehicle 700. In this case, the cross-camera view image extraction function 112 detects a shared region 416 that represents a shared region appearing in their overlapping fields. The cross-camera view image extraction function 112 extracts the shared region 416 from each of the first image frame 412 and the second image frame 414 to generate the pair of cross-camera view images 114 shown at 422 and 424. The cross-camera view image 422 may comprise a field of view corresponding to the shared region 416 extracted from the first image frame 412, and the cross-camera view image 424 may comprise a field of view corresponding to the shared region 416 extracted from the second image frame 414.

Figure 2:
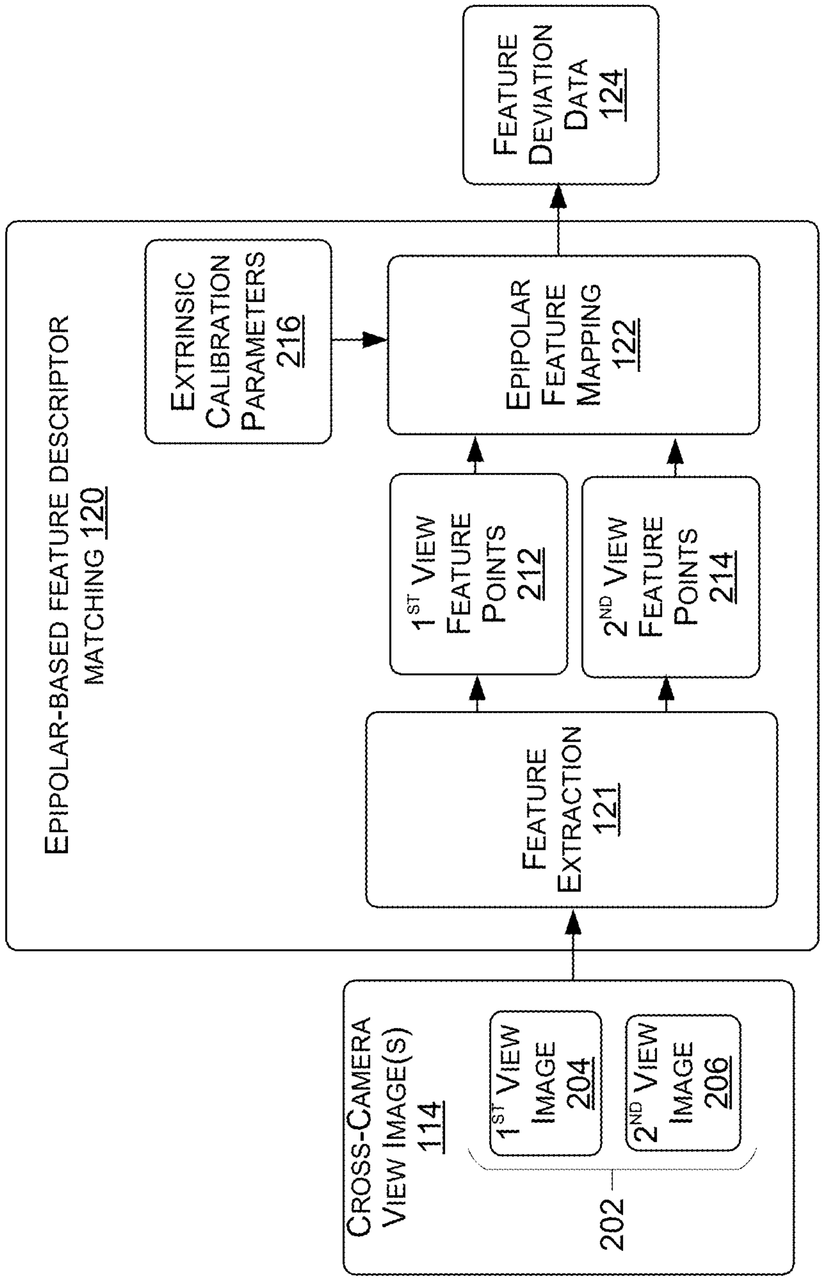
FIG. 2 is a diagram illustrating an example flow diagram for epipolar-based feature descriptor matching, in accordance with some embodiments of the present disclosure.

Returning to FIG. 1, a resulting pair of cross-camera view images 114 produced by the cross-camera view image extraction function 112 may be output to the epipolar-based feature descriptor matching function 120, which may apply feature extraction 121 and an epipolar feature mapping algorithm 122 to generate feature deviation data 124, as detailed with respect to FIG. 2. In some embodiments, one or both of the resulting cross-camera view images 114 may be further filtered or processed to correct for distortions (e.g., a barrel distortion) and/or other image warping applied to increase the similarity of appearance of features within the images. Based on the resulting cross-camera view images 114, epipolar constraint-guided feature descriptor matching may be performed.

Referring now to FIG. 2, FIG. 2 illustrates an example embodiment of the epipolar-based feature descriptor matching function 120 comprising the feature extraction 121 and the epipolar feature mapping 122. The epipolar-based feature descriptor matching function 120 inputs the cross-camera view images 114, which may comprise a cross-camera view image pair 202 that includes a first view image 204 and a second view image 206. The cross-camera view image pair 202 may be received by the feature extraction 121, which executes a feature extraction algorithm to detect feature points appearing in both image frames for use in performing feature descriptor matching. The feature extraction 121 may generate a first set of view feature points 212 corresponding to extracted features from the first view image 204, and a second set of view feature points 214 corresponding to extracted features from the second view image 206. The first set of view feature points 212 and the second set of view feature points 214 may be processed by the epipolar feature mapping algorithm 122 to generate the feature deviation data 124. As discussed herein, the epipolar feature mapping algorithm 122 takes one or more feature points from one of the view images of the pair 202 and maps those feature points to their corresponding epipolar line in the other view image, based on the currently existing extrinsic calibration parameters 216 associated with the paired image sensors 102 that produced the cross-camera view images 114. In some embodiments, the extrinsic calibration parameters 216 may comprise distinct extrinsic calibration parameters for the individual image sensors of the paired image sensors 102, and those distinct extrinsic calibration parameters may be used to compute overall composite extrinsic calibration parameters corresponding to that particular pair of image sensors.

For a given feature point appearing in a selected shared region from both images, the epipolar feature mapping algorithm 122 constrains matching of feature descriptors based on the epipolar lines that describe the relationship between the fields of view of the paired image sensors 102.

To produce the feature deviation data 124, the epipolar-constrained guided feature descriptor matching by the epipolar feature mapping algorithm 122 may be performed between the images using one feature point or a plurality of feature points (e.g., thousands of feature points) from the selected shared region. The location and orientation of a feature point's projection onto the corresponding epipolar line in the counterpart view image is at least in part a function of the extrinsic relationship (rotation and translation) between the two paired image sensors 102, and is a function of the extrinsic calibration parameters 216. As such, if the extrinsic calibration parameters 216 for the two paired image sensors 102 are correct, then by using the extrinsic calibration parameters 216, the epipolar feature mapping algorithm 122 should map a feature point appearing in the first view image 204 to an epipolar line associated with the feature point in the second view image 206. Conversely, for a feature appearing at a feature point in the second view image 206, if the extrinsic calibration parameters 216 for the two paired image sensors 102 are correct, the epipolar feature mapping algorithm 122 should map that feature point to an epipolar line associated with the feature point in the first view image 204. If the feature points of one image do not map to the position of the expected epipolar lines in the second image, then that means that one or more components of the extrinsic calibration parameters 216 no longer accurately represent the present true extrinsic relationship between the two paired image sensors 102 (e.g., either one or both of the distinct extrinsic calibration parameters for the individual image sensors may have drifted). Deviations between the location of the matched feature point from its computed epipolar line indicates that the rotation and translation characteristics of at least one of the two cameras (and possibly of both cameras) has changed since the extrinsic calibration parameters 216 were determined at the last calibration. The amount of deviation may directly indicate how far off the extrinsic calibration parameters are from representing the current relative extrinsic parameter state (rotation and translation) between the two cameras.

Figure 3B:
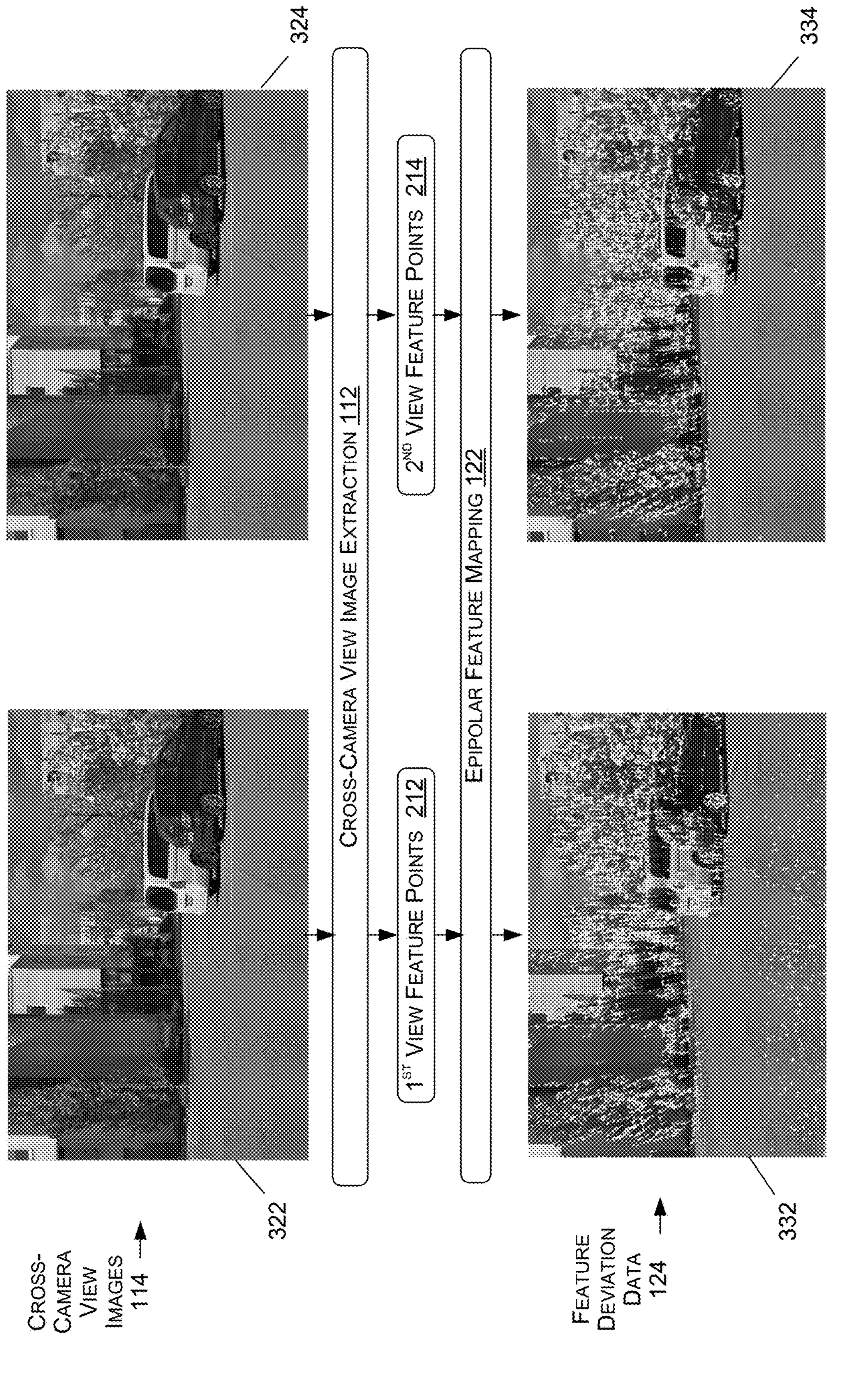

For example, referring to FIG. 3B, FIG. 3B illustrates an epipolar-constrained feature matching performed by the epipolar feature matching function 122. In this example, the cross-camera view images 114 (in this example, cross-camera view image 322 and cross-camera view image 324) are processed by the cross-camera view image extraction function 112 to respectively generate the first view feature points 212 and the second view feature points 214. The epipolar feature matching function 122 may process the first view feature points 212 and the second view feature points 214 based on epipolar constraint-guided feature descriptor matching to generate the feature deviation data 124 represented by a respective first deviation data frame 332 and a second deviation data frame 334. In each of the first deviation data frame 332 and the second deviation data frame 334, feature points are represented along with their corresponding epipolar lines based on the location of those feature points from the counterpart image.

Figure 3C:
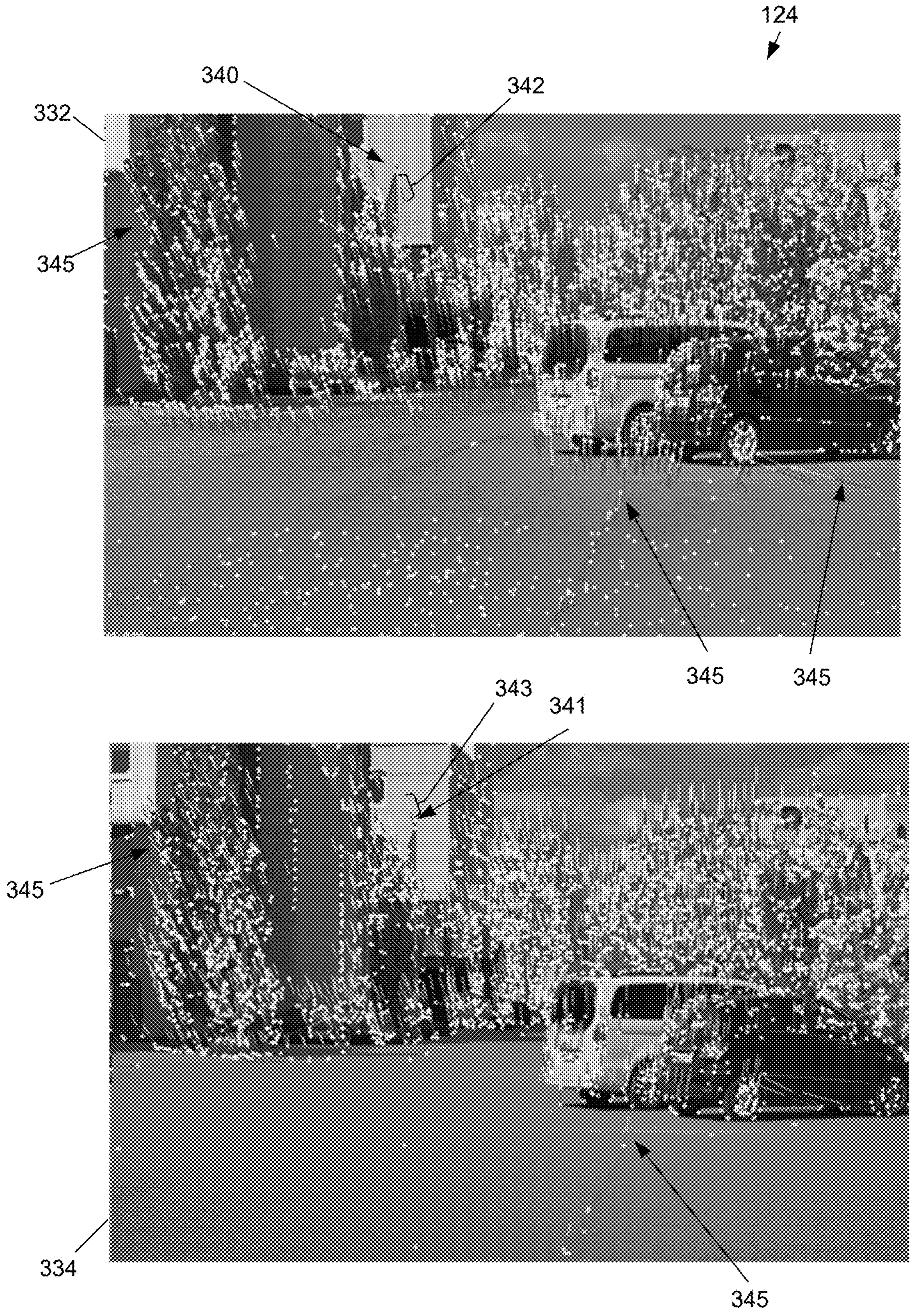

For example, referring now to FIG. 3C, a feature point extracted from the first cross-camera view image 322 may represent a feature such as a top of a flag pole appearing in the first deviation data frame 332 as feature point 340. The corresponding feature point extracted from the second cross-camera view image 324 may appear in the second deviation data frame 334 as feature point 341. Based on the extrinsic calibrating parameters 216, the epipolar feature matching function 122 computes an epipolar line 343 that corresponds to the mapping of the feature point 340 into the second deviation data frame 334. Similarly, based on the extrinsic calibrating parameters 216, the epipolar feature matching function 122 computes an epipolar line 342 that corresponds to the mapping of the feature point 341 into the first deviation data frame 332. For the first deviation data frame 332, the amount of alignment deviation between the feature point 340 and the epipolar line 342 (e.g., a Euclidian distance or other deviation metric) may be computed and represents an indication of the accuracy of the extrinsic calibrating parameters 216. For the second deviation data frame 334, the amount of alignment deviation between the feature point 341 and the epipolar line 343 (e.g., a Euclidian distance or other deviation metric) may be computed and also represents an indication of the accuracy of the extrinsic calibrating parameters 216. Similar deviation values may be computed and represented in the feature deviation data 124 for one or more of the other feature points (such as shown generally at 345) included in the first view feature points 212 and second view feature points 214 produced by the cross-camera view extraction 112. The amounts of deviation for each matched set of feature descriptors from the feature deviation data 124 may be aggregated and processed by a statistical algorithm to compute a calibration validation score for the two paired image sensors 102 that captured the pair of camera images 312 and 314.

Figure 4B:
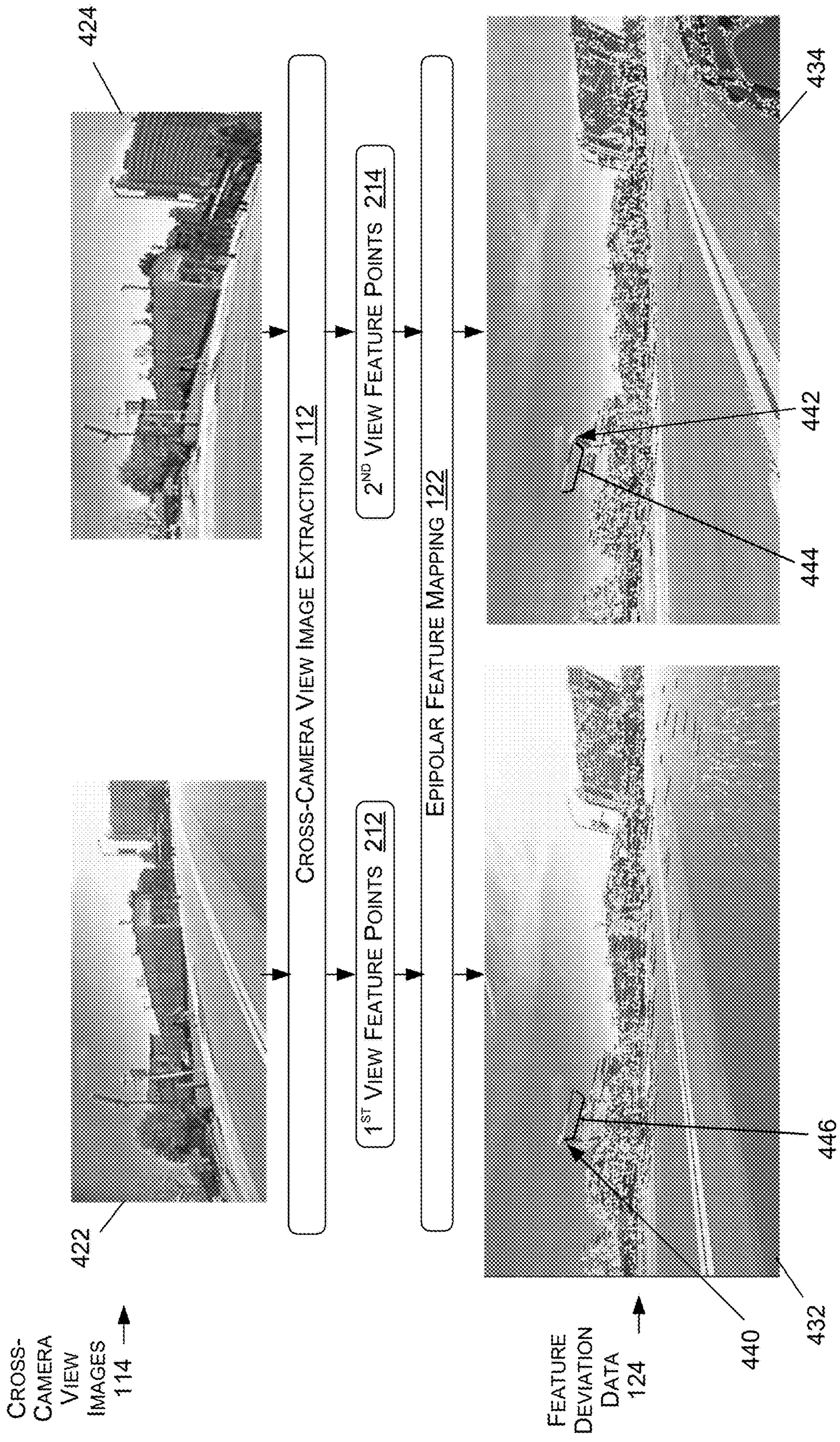

As similarly shown in FIG. 4B, the epipolar feature matching function 122 performs an epipolar-constrained feature matching using the cross-camera view image 422 and cross-camera view image 424 from FIG. 4A to respectively generate the first view feature points 212 and the second view feature points 214. The epipolar feature matching function 122 may process the first view feature points 212 and the second view feature points 214 based on epipolar constraint-guided feature descriptor matching to generate the feature deviation data 124 that includes the first deviation data frame 432 and a second deviation data frame 434.

In this example, a feature point extracted from the first cross-camera view image 422 may represent a feature such as a top of a lamp post, appearing in the first deviation data frame 432 as feature point 440. The corresponding feature point extracted from the second cross-camera view image 424 may appear in the second deviation data frame 434 as feature point 442. Based on the extrinsic calibrating parameters 216, the epipolar feature matching function 122 computes an epipolar line 444 that corresponds to the mapping of the feature point 440 into the second deviation data frame 434. Similarly, based on the extrinsic calibrating parameters 216, the epipolar feature matching function 122 computes an epipolar line 446 that corresponds to the mapping of the feature point 442 into the first deviation data frame 432. For the first deviation data frame 432, the amount of alignment deviation between the feature point 440 and the epipolar line 446 (e.g., a Euclidian distance or other deviation metric) may be computed and represents an indication of the accuracy of the extrinsic calibrating parameters 216. For the second deviation data frame 434, the amount of alignment deviation between the feature point 442 and the epipolar line 444 (e.g., a Euclidian distance or other deviation metric) may be computed and also represents an indication of the accuracy of the extrinsic calibrating parameters 216. Similar deviation values may be computed and represented in the feature deviation data 124 for one or more of the other feature points included in the first view feature points 212 and second view feature points 214 produced by the cross-camera view extraction 112. The amounts of deviation for each matched set of feature descriptors from the feature deviation data 124 may be aggregated and processed by a statistical algorithm to compute a calibration validation score for the two paired image sensors 102 that captured the paired camera images 412 and 414.

Referring again to FIG. 1, the calibration validation system 100 may comprise a calibration scoring function 130 that processes feature deviation data 124 to compute validation score(s) 134. The calibration scoring function 130 may compute an aggregate validation score that is based on individual deviation alignments computed between the feature points and their associated epipolar lines. The validation score(s) 134 may, for example, be used by one or more downstream processes such as a vehicle diagnostics system 140. In some embodiments, if a validation score 134 meets a validation criteria (e.g., an aggregated deviation less than a predetermined deviation threshold) then the vehicle diagnostics system 140 may generate an output indicating that the calibration between the paired image sensors 102 passes the validation test and is sufficient for continued use. If the validation score does not meet the validation criteria, then the vehicle diagnostics system 140 may generate an output indicating that the calibration between the pair of cameras is not passing the validation test. Based on a non-passing validation score 134, the vehicle diagnostics system 140 may produce a vehicle maintenance alert that may be displayed within the vehicle and/or transmitted to, for example, a cloud-based vehicle maintenance monitoring system, so that a vehicle service may be performed for recalibration of one or both of the paired image sensors 102.

Figure 5A:
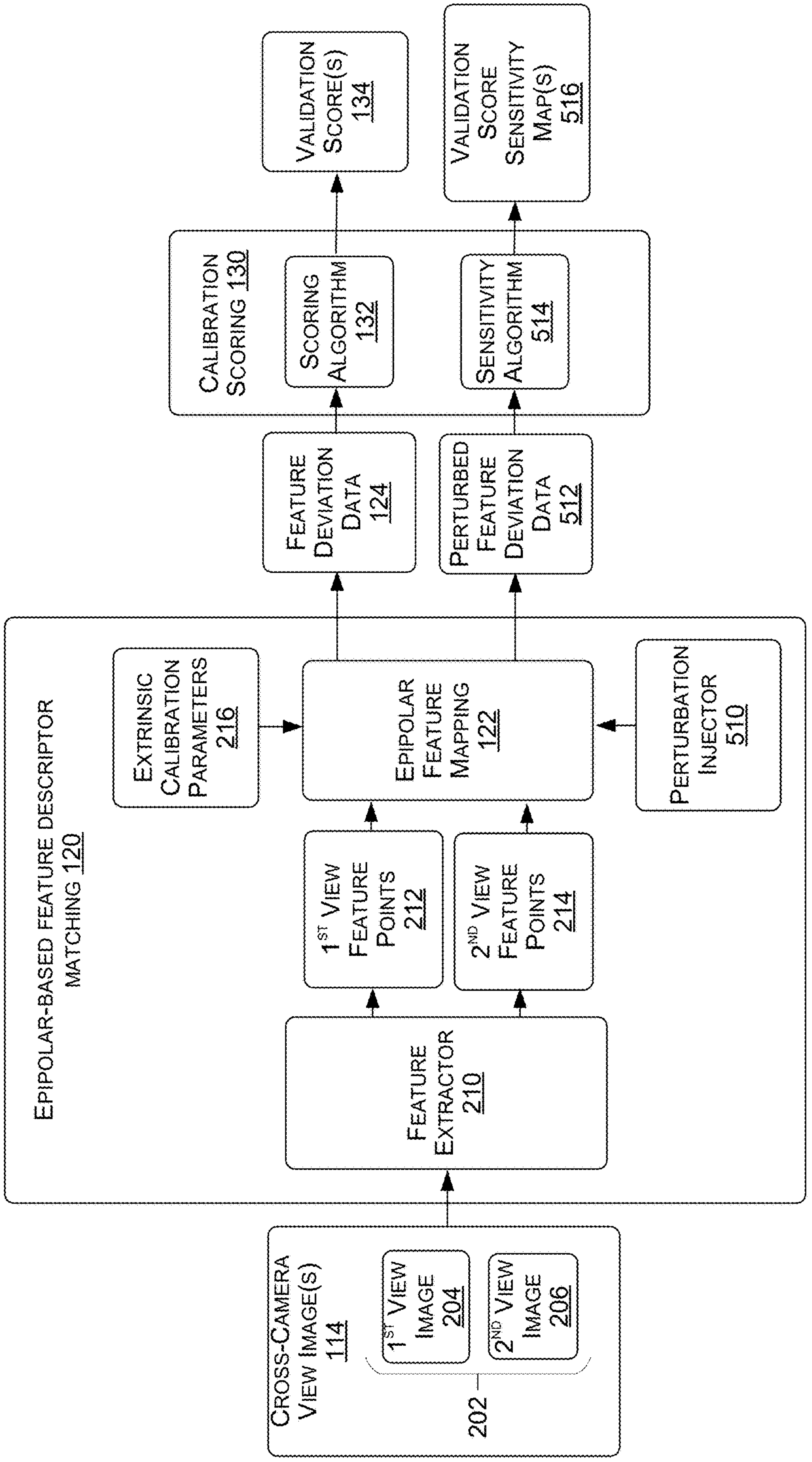
FIGS. 5A-5B are diagrams illustrating a camera calibration validation system implementing sensitivity analysis, in accordance with some embodiments of the present disclosure.

Referring now to FIG. 5A, in some embodiments, the calibration validation system 100 may perform a sensitivity analysis to the validation scores 134 to better assess the usefulness of the validation score 134. In these embodiments, the epipolar-based feature descriptor matching function 120 may include a perturbation injector 510 that may introduce perturbations to the extrinsic calibration parameters 216, and/or may be introduced to other noise to determine the sensitivity of validation scores 134. For example, the epipolar feature mapping algorithm 122 may compute the feature deviation data 124, as described above, based on unperturbed extrinsic calibration parameters 216, and may also compute perturbed feature deviation data 512 based on perturbations introduced to the extrinsic calibration parameters 216 by the perturbation injector 510. For example, the perturbation injector 510 may introduce a perturbation of the extrinsic calibration parameters 216, such as a bias to the rotation angles and/or a bias to the translation values of the extrinsic calibration parameters 216—with validation scores recomputed at each perturbation to generate the perturbed feature deviation data 512. The perturbation injector 510 may sweep across a range of rotation and/or translation perturbations as the epipolar feature mapping algorithm 122 recomputes validation scores using the same image pair 202 used to compute the feature deviation data 124. If validation scores computed from the perturbed feature deviation data 512 do not change substantially in response to the perturbations of the extrinsic calibration parameters 216, then that indicates that the validation score 134 is largely insensitive to change in that parameter and likely represents a poor indication regarding the extrinsic parameter state of the corresponding set of paired image sensors 102. In contrast, if validation scores computed from the perturbed feature deviation data 512 do change substantially (e.g., in excess of a tolerance threshold) in response to the perturbations of the extrinsic calibration parameters 216, then that indicates that the validation score 134 is sensitive to a change in those parameters and is potentially an accurate indication of the extrinsic parameter state of that set of paired image sensors 102. In some embodiments, the calibration scoring function 130 may output an indication of sensitivity based on the perturbed feature deviation data 512. As an example, the calibration scoring function 130 may comprise a sensitivity algorithm 514 that generates one or more validation score sensitivity maps 516 corresponding to the set of paired image sensors 102 and/or image pair 202. For example, a validation score sensitivity map 516 may indicate how deviation data and/or validation score(s) vary in response to perturbations that include a range of rotation and/or translation perturbation sweeps. The validation score sensitivity map 516 may illustrate changes in the validation score as a function of perturbation magnitudes that may be fit to curves (e.g., parabolas) representing validation score sensitivity.

Figure 5B:
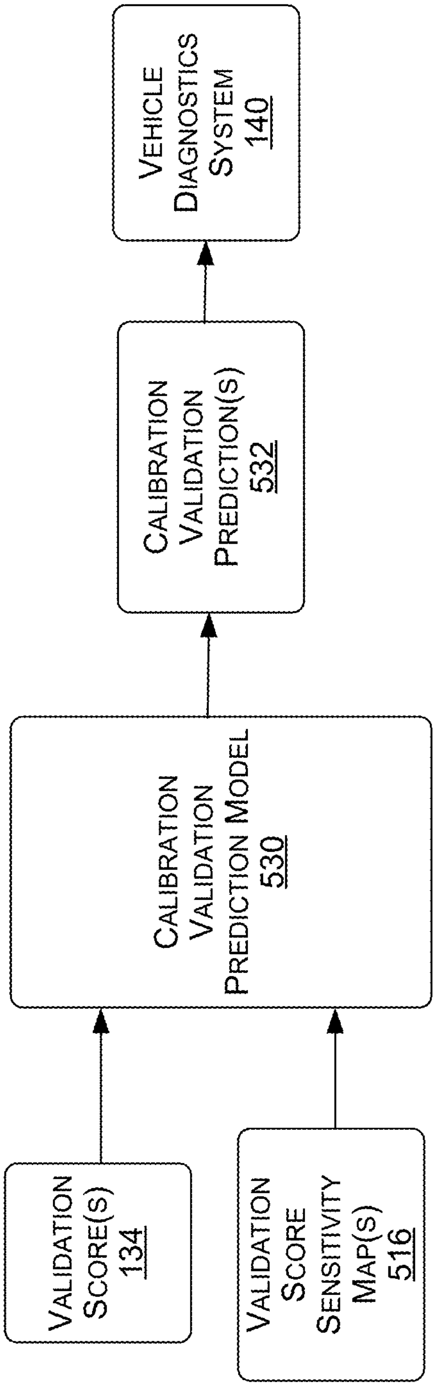

As illustrated in FIG. 5B, in some embodiments, one or more validation score sensitivity maps 516 and or validation score(s) 134 may be applied to a calibration validation prediction model 530, such as a machine learning model trained as a classification model, to produce one or more calibration validation predictions 532. Based on the output of the scoring algorithm 132 and/or sensitivity algorithm 514, the calibration validation prediction model 530 may be trained to infer whether the paired image sensors 102 are classified as within calibration tolerance (e.g., a passing extrinsic calibration state) or not within calibration tolerance (e.g., a non-passing extrinsic calibration state) and generate a calibration validation prediction 532 indicating the classification. In some embodiments, validation score sensitivity maps 516 and/or validation scores 134 from a plurality of different sets of paired image sensors 102 may be processed by the calibration validation prediction model 530 to generate predictions 532 that may isolate calibration anomalies to specific cameras, for example, based on evaluating classification predictions for separate individual camera pairs as discussed above and identifying sensors that contribute to more than one pairing that has received a non-passing classification. Based on the classification provided by the predictions 532, one or more actions may be triggered (e.g., by a vehicle diagnostics system 140), such as, but not limited to, displaying a calibration warning to the vehicle operator, adjusting the operation of one or more vehicle control systems, and/or reporting the condition to a cloud-based monitoring or telemetry system. In some embodiments, the vehicle diagnostics system 140, and/or other downstream system that uses image data from one or both of the paired image sensors 102, may adjust if and/or how the image data is used in response to one or more low validation scores 134 (e.g., below one or more thresholds) and/or calibration validation prediction(s) 532. For example, one or more operations of the vehicle 700 may adjust a confidence level associated with the image data and weight the influence of image data from the paired image sensors 102 lower when confidence in the image data is less than a threshold. In some embodiments, the vehicle diagnostics system 140, and/or other downstream system that uses image data from one or both of the paired image sensors 102, may disable one or more features based at least on when validation score(s) 134 are below a confidence threshold and/or when calibration validation prediction(s) 532 indicate that the calibrations for the paired image sensors 102 are not within a calibration tolerance.

Figure 6:
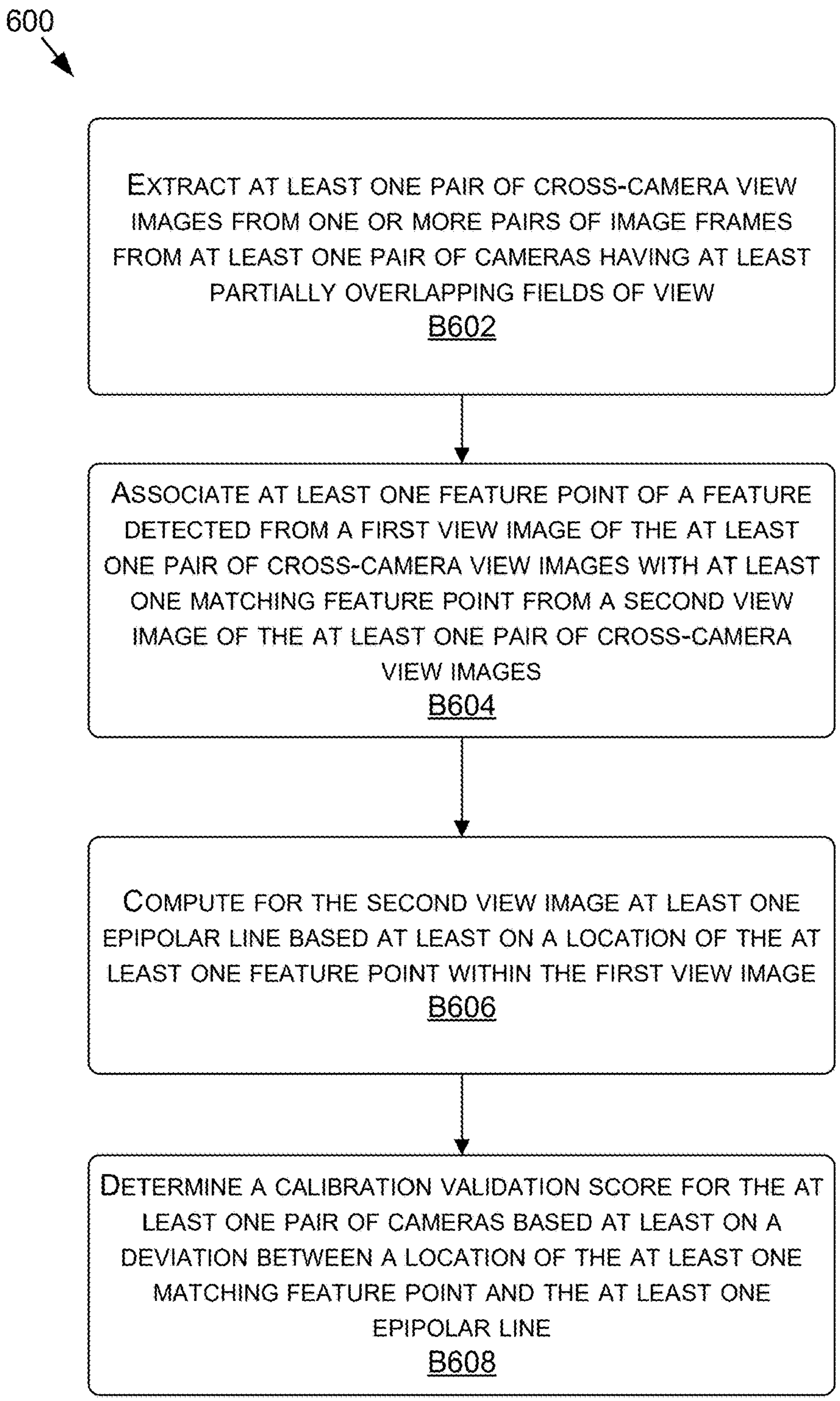
FIG. 6 is a flow chart illustrating a method for camera calibration validation, in accordance with some embodiments of the present disclosure.

Now referring to FIG. 6, FIG. 6 is a flow diagram showing a method 600 for image sensor calibration validation, in accordance with some embodiments of the present disclosure. It should be understood that the features and elements described herein with respect to the method 600 of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa. Each block of method 600, described herein, comprises a computing process that may be performed using any combination of hardware, firmware, and/or software. For instance, various functions may be carried out by one or more processors comprising processing circuitry to execute instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the systems of FIGS. 1, 5A, and/or 5B. However, the method may additionally or alternatively be executed by any one system, or any combination of systems, including, but not limited to, those described herein.

As discussed herein in greater detail, in some embodiments the method may include generating an indication of calibration validation for at least one pair of cameras based at least on associating at least one feature point of a feature detected from a first view image with at least one matching feature point from a second view image and computing a deviation between a location of the at least one matching feature point and at least one epipolar line computed for the second view image based at least on the at least one feature point within the first view image.

The method 600, at block B602, includes extracting at least one pair of cross-camera view images from one or more pairs of image frames from at least one pair of cameras having at least partially overlapping fields of view. For example, image data from paired image sensors 102 may be input into a cross-camera view alignment function 110, as shown in FIG. 1. The cross-camera view alignment function 110 comprises a cross-camera view image extraction function 112 that may perform an image extraction from one or both of the images of paired camera image data 104 to obtain a pair of cross-camera view images 114. The cross-camera view image extraction function 112 may extract a pair of cross-camera view images 114 that comprise image features that are overlapping features appearing in image frames from both of the paired image sensors 102 in the paired camera image data 104. In some embodiments, a first camera of the at least one pair of cameras may capture a different angle of view (e.g., have a different focal length) than a second camera of the at least one pair of cameras.

At least one of the first view image and the second view image may be processed to correct for one or more distortions to increase a similarity of appearance of one or more features between the first view image and the second view image. For example, one or both of the resulting cross-camera view images may be further filtered or processed to correct for distortions (e.g., a barrel distortion) or other image warping applied to increase the similarity of appearance of features within the images. Based at least on the resulting pair of cross-camera view images, epipolar constraint-guided feature descriptor matching may be performed.

The method 600, at block B604, includes associating at least one feature point of a feature detected from a first view image of the at least one pair of cross-camera view images with at least one matching feature point from a second view image of the at least one pair of cross-camera view images. Using a pair of image frames simultaneously captured by each camera, a shared region of their overlapping field of view may be extracted and used as the basis to perform an epipolar constraint-guided feature descriptor matching process. In that process, a feature commonly appearing in both image frames may be used to perform feature descriptor matching to try to match feature points between the two views represented by the pair of image frames. For example, in some embodiments, a feature extraction algorithm (e.g., Oriented FAST and rotated BRIEF (ORB)) may be applied to the pair of cross-camera view images to identify feature points from features appearing in the images, and extract feature descriptors from those features points. This is illustrated in FIG. 2, where the cross-camera view image pair 202 may be received by the feature extraction 121. The feature extraction 121 executes a feature extraction algorithm to detect feature points appearing in both image frames for use in performing feature descriptor matching. The feature extraction 121 may generate a first set of view feature points 212 corresponding to extracted features from the first view image 204, and may generate a second set of view feature points 214 corresponding to extracted features from the second view image 206. In some embodiments, feature points of the feature detected from the first view image may be associated with the at least one matching feature point from the second view image based at least on a vector representing at least one feature descriptor of the at least one feature point.

The method 600, at block B606, includes computing for the second view image at least one epipolar line based at least on a location of the at least one feature point within the first view image. As illustrated at least by FIGS. 3B and 4B, the epipolar feature mapping algorithm 122 may select one or more feature points from one of the view images of the pair 202, and map those feature points to their corresponding epipolar line in the other view image based at least on the currently existing extrinsic calibration parameters 216 associated with the paired image sensors 102 that produced the cross-camera view images 114. The epipolar feature matching function 122 may process the first view feature points 212 and the second view feature points 214 based at least on epipolar constraint-guided feature descriptor matching to generate the feature deviation data 124 represented by a respective first deviation data frame 332 and a second deviation data frame 334. In each of the first deviation data frame 332 and the second deviation data frame 334, feature points are represented along with their corresponding epipolar lines based at least on the location of those feature points from the counterpart image.

The method 600, at block B608, includes determining a calibration validation score for the at least one pair of cameras based at least on a deviation between a location of the at least one matching feature point and the at least one epipolar line. As discussed with respect to FIG. 1, one or more validation scores 134 provide an indication of whether a current set of extrinsic camera calibration parameters associated with the paired image sensors 102 are at least sufficiently accurate to satisfy a validation criteria. A plurality of calibration validation scores for the at least one pair of cameras may be aggregated to produce a composite validation score based at least on a series of pairs of cross-camera view images captured over a span of time. For example, the calibration scoring function 130 may compute an aggregate validation score that is based at least on individual deviation alignments computed between the feature points and their associated epipolar lines. The validation score(s) 134 may, for example, be used by one or more downstream processes such as a vehicle diagnostics system 140. In some embodiments, if a validation score 134 meets a validation criteria (e.g., an aggregated deviation less than a predetermined deviation threshold), then the vehicle diagnostics system 140 may generate an output indicating that the calibration between the paired image sensors 102 passes the validation test and is sufficient for continued use. If the validation score does not meet the validation criteria, then the vehicle diagnostics system 140 may generate and output an indication that the calibration between the camera pair is not passing the validation test. In some embodiments, the validation score may be computed by a camera calibration scoring function, using as input a set of deviation data from the epipolar-based feature descriptor matching function.

To produce the feature deviation data 124, the epipolar-constrained guided feature descriptor matching by the epipolar feature mapping algorithm 122 may be performed between the images using one feature point or a plurality of feature points (e.g., thousands of feature points) from the selected shared region. The location and orientation of a feature point's projection onto the corresponding epipolar line in the counterpart view image is at least in part a function of the extrinsic relationship (rotation and translation) between the two paired image sensors 102, which is a function of the extrinsic calibration parameters 216. Deviations between the location of a matched feature point from its computed epipolar line indicates that the rotation and translation characteristics of at least one of the two cameras (and possibly of both cameras) has changed since the extrinsic calibration parameters 216 were determined at the last calibration. The amount of deviation may directly indicate how far off the extrinsic calibration parameters are from representing the current relative extrinsic parameter state (rotation and translation) between the two cameras.

In some embodiments, the at least one pair of cameras may comprise a plurality of camera pairs. The method may, in such embodiments, isolate one or more calibration anomalies to at least a first camera of the at least one pair of cameras based at least on one or more calibration validation scores computed for diverse pairings of the plurality of camera pairs.

As discussed herein, the method may further include performing a sensitivity analysis to better assess the usefulness of a validation score. For example, the epipolar-based feature descriptor matching function 120 may include a perturbation injector 510 that may introduce perturbations to the extrinsic calibration parameters 216, and/or may introduce other noise to determine the sensitivity of validation scores 134. The epipolar feature mapping algorithm 122 may compute the feature deviation data 124, as described above, based on unperturbed extrinsic calibration parameters 216, and may also compute perturbed feature deviation data 512 based on perturbations introduced to the extrinsic calibration parameters 216 by the perturbation injector 510. The perturbation injector 510 may introduce a perturbation of the extrinsic calibration parameters 216, such as a bias to the rotation angles and/or a bias to the translation values of the extrinsic calibration parameters 216—with validation scores recomputed at each perturbation to generate the perturbed feature deviation data 512. The perturbation injector 510 may sweep across a range of rotation and/or translation perturbations as the epipolar feature mapping algorithm 122 recomputes validation scores using the same image pair 202 used to compute the feature deviation data 124. As such, the method may include computing at least one sensitivity metric for the calibration validation score based at least on applying a range of perturbations to at least one extrinsic calibration parameter used to compute the at least one epipolar line. An indication of calibration validation score sensitivity may be generated and output based at least on the at least one sensitivity metric. In some embodiments, the indication of calibration validation score sensitivity may comprise a validation score sensitivity map. The map may be generated based at least on the at least one sensitivity metric computed by applying the range of perturbations. Moreover, as discussed with respect to FIG. 5B, one or more validation score sensitivity maps 516 and or validation score(s) 134 may be applied to a calibration validation prediction model 530, such as a machine learning model trained as a classification model. That is, in some embodiments of the method, a calibration validation classification for the at least one pair of cameras may be predicted based at least on applying a machine learning classification model to at least the validation score sensitivity data. Based at least on the output of the scoring algorithm 132 and/or sensitivity algorithm 514, the calibration validation prediction model 530 may be trained to infer whether the paired image sensors 102 are classified as within calibration tolerance (e.g., a passing extrinsic calibration state) or not within calibration tolerance (e.g., a non-passing extrinsic calibration state).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 7A:
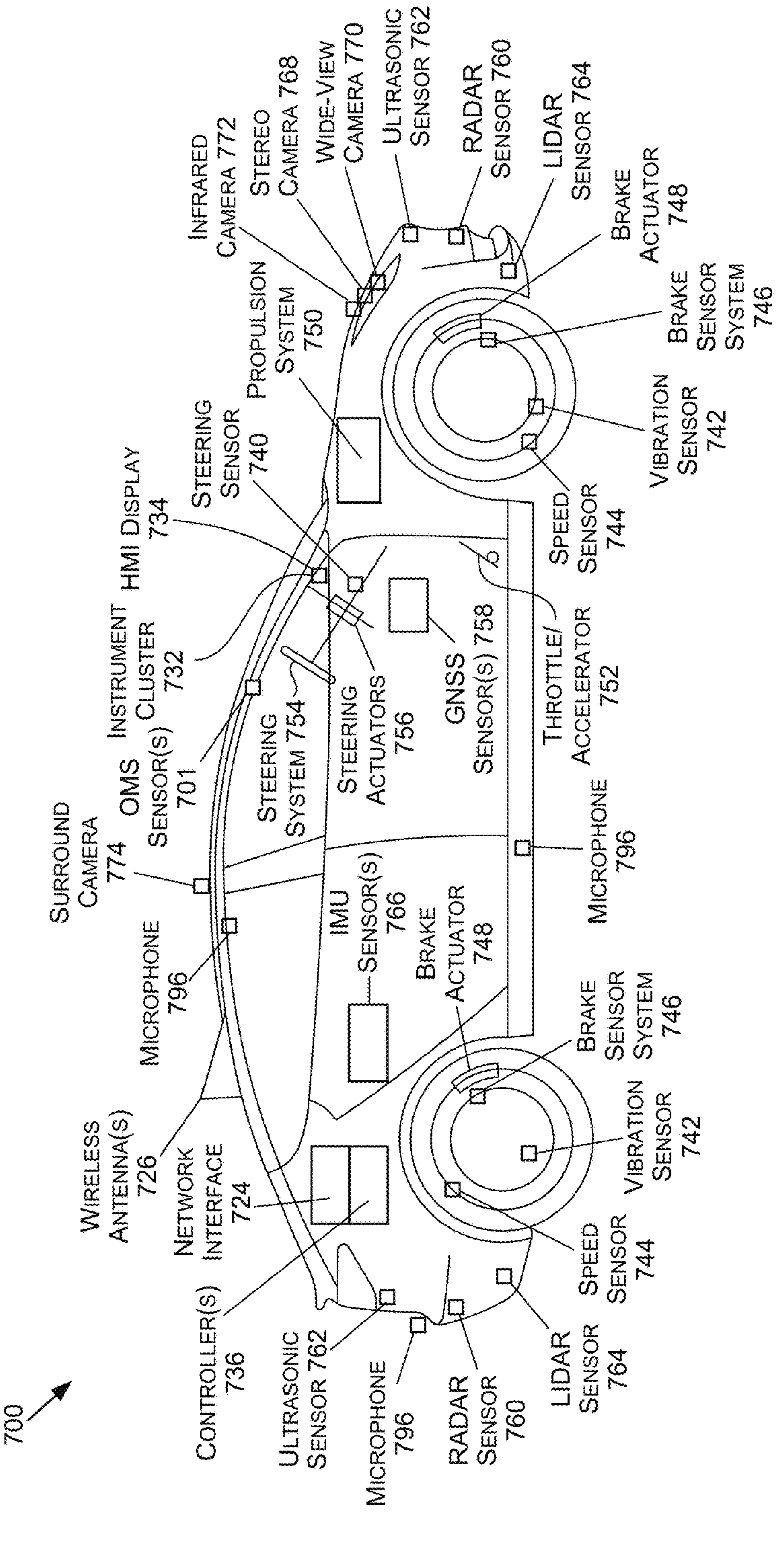
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), one or more occupant monitoring system (OMS) sensor(s) 701 (e.g., one or more interior cameras), and/or other sensor types. In some embodiments, paired image sensors 102 may comprise any pairing of image sensors/cameras of the vehicle 700 that have at least partially overlapping fields of view.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
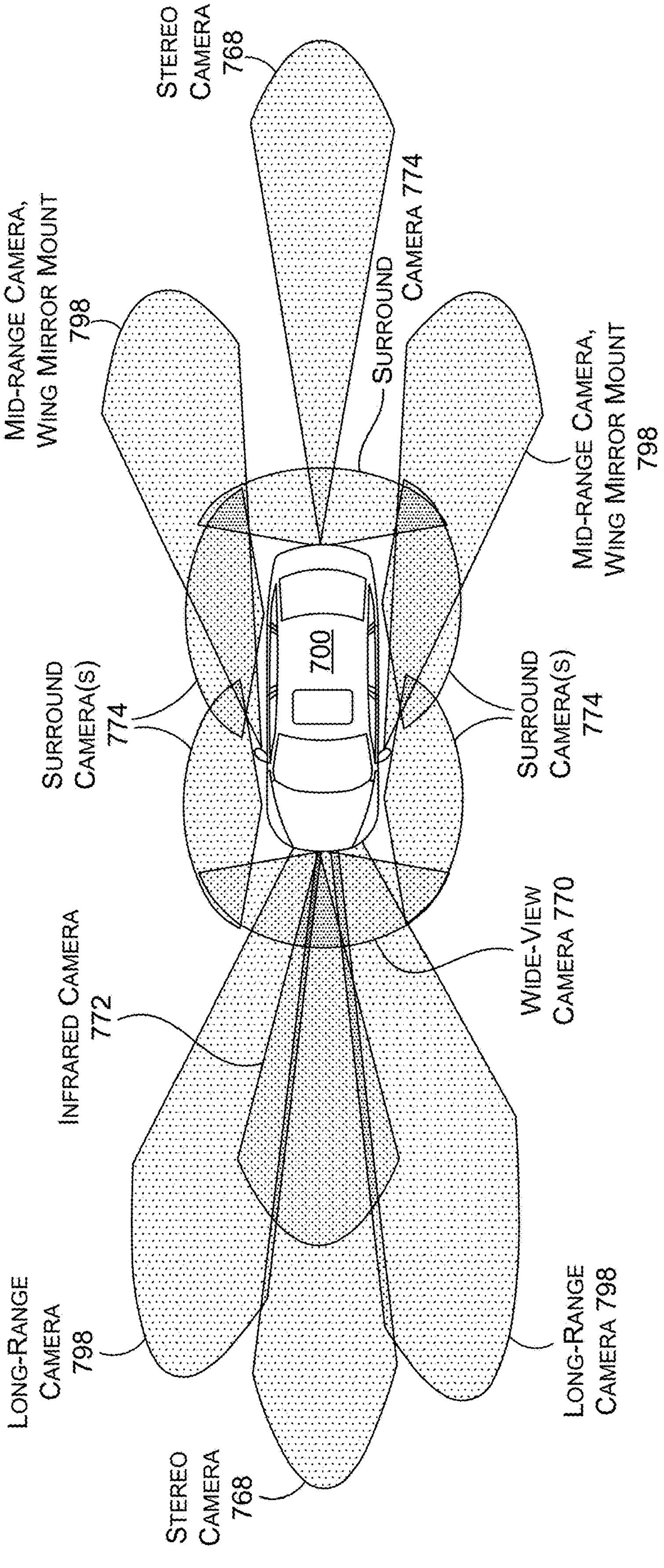
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Cameras with a field of view that include portions of the interior environment within the cabin of the vehicle 700 (e.g., one or more OMS sensor(s) 701) may be used as part of an occupant monitoring system (OMS) such as, but not limited to, a driver monitoring system (DMS). For example, OMS sensors (e.g., the OMS sensor(s) 701) may be used (e.g., by the controller(s) 736) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 7C:
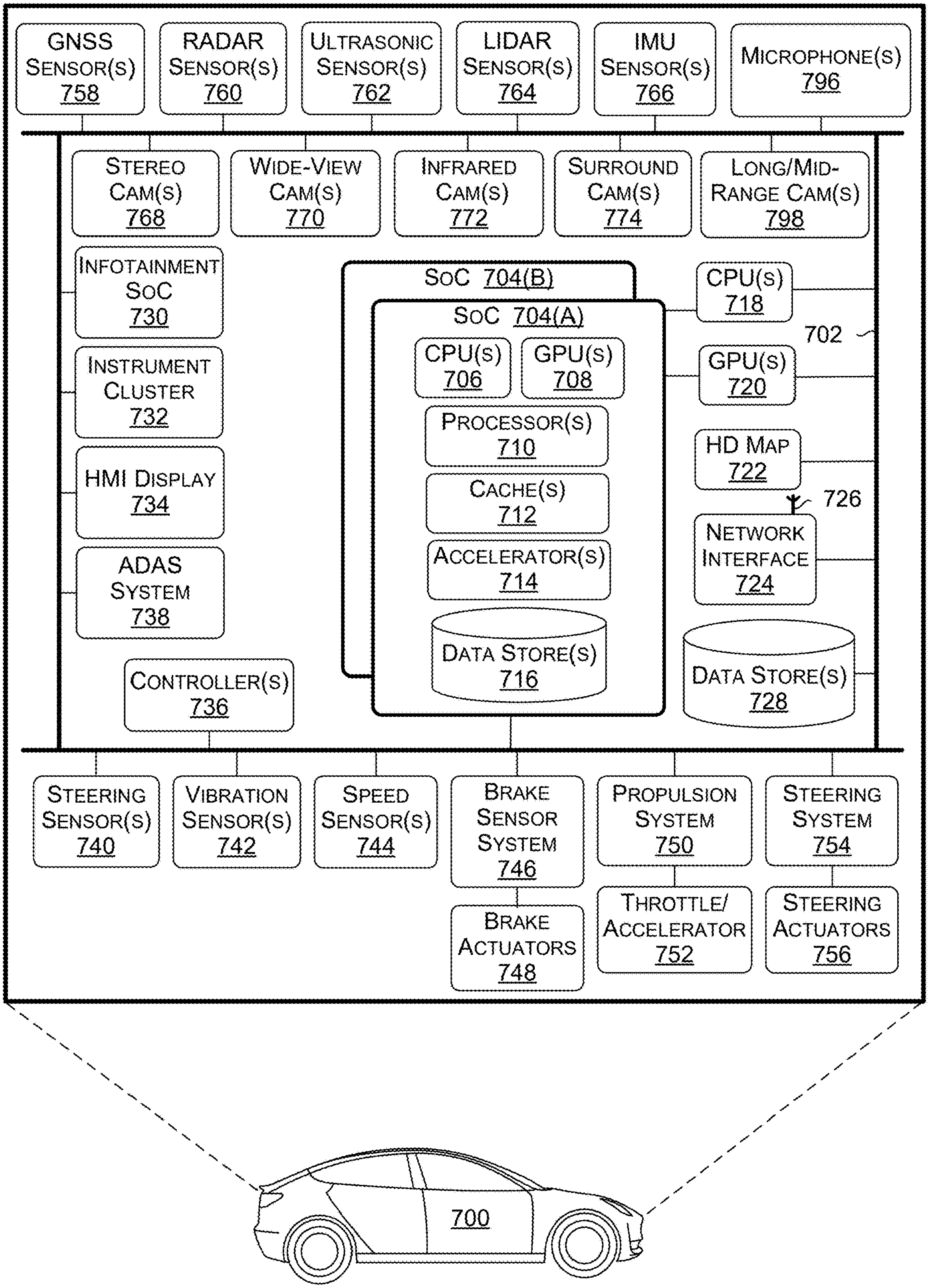
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 704 may include one or more FPUs integrated as execution units within a CPU(s) 706 and/or GPU(s) 708. In some embodiments, one or more of the functions described herein with respect to the calibration validation system 100, cross-camera view alignment 110, epipolar-based feature descriptor matching 120 and/or calibration scoring 130 may be implemented using code executed on one or more of the CPU(s) 706, GPU(s) 708, SoC(s) 704 and/or other processing circuitry.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 716 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
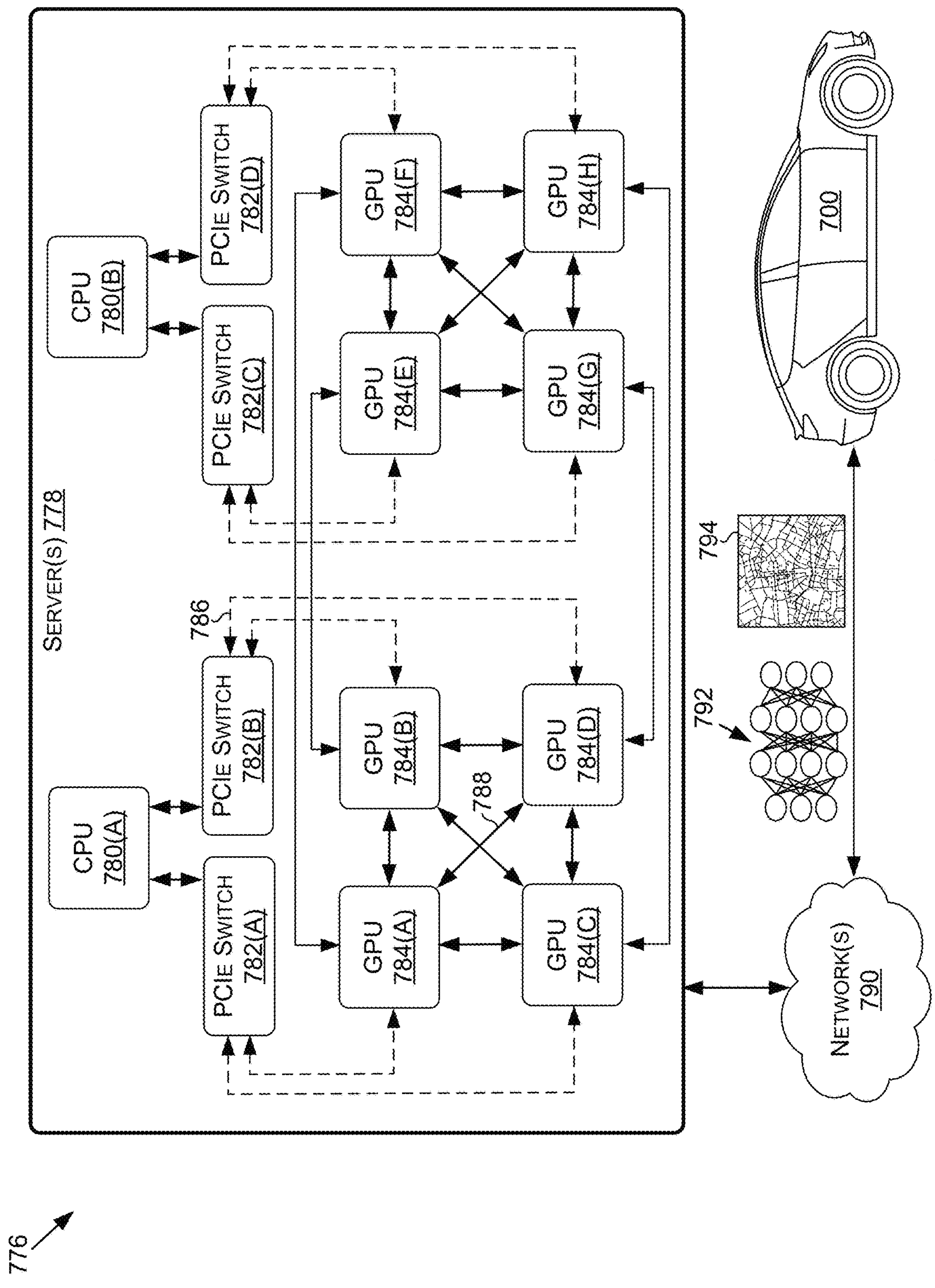
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(D) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers). In some embodiments, one or more machine learning models of the calibration validation system 100 may at least in part be implemented using the neural networks 792 and/or trained using the server(s) 778 and/or other servers.

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
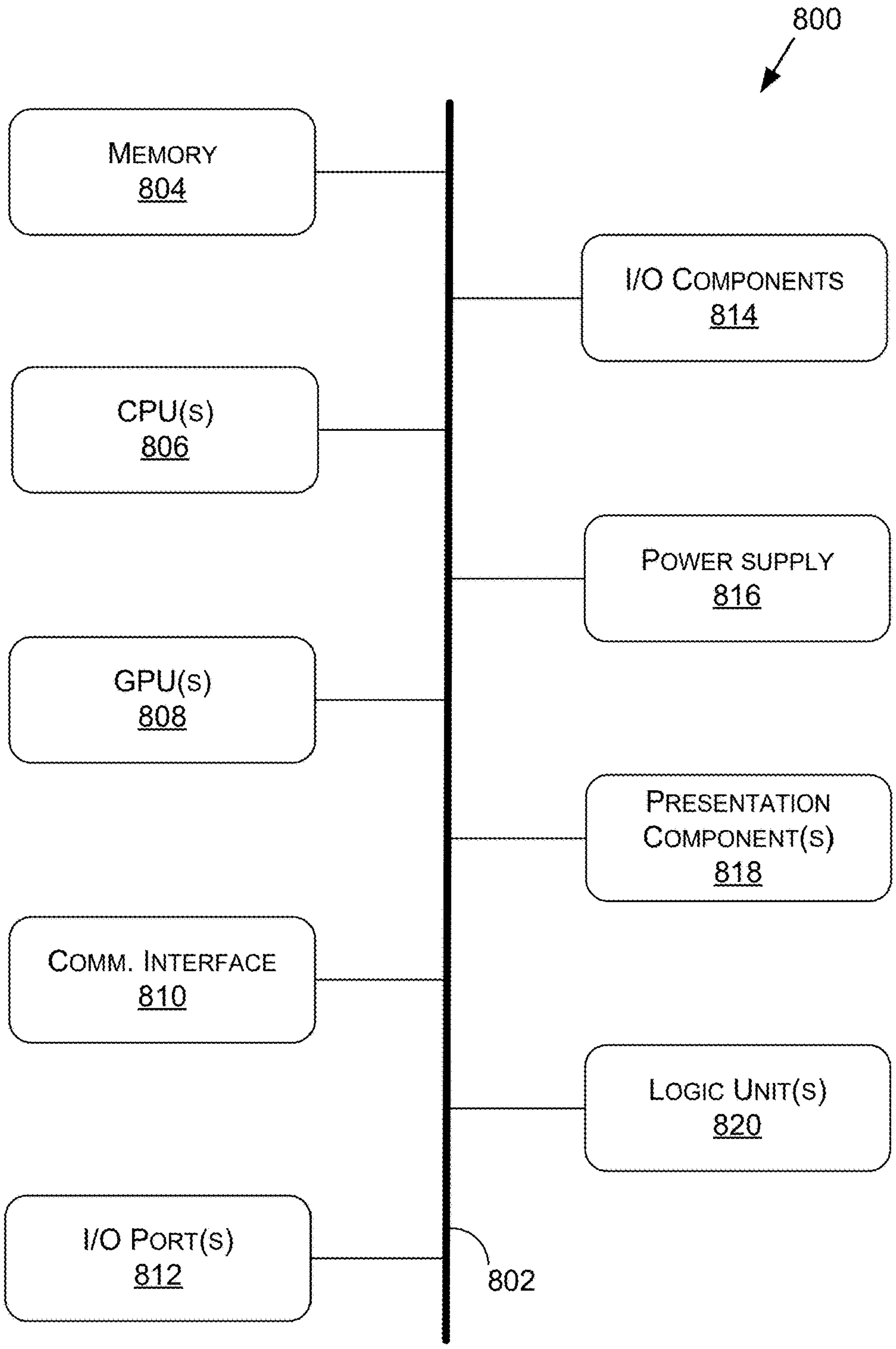
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8. In some embodiments, one or more of the functions described herein with respect to the calibration validation system 100, cross-camera view alignment 110, epipolar-based feature descriptor matching 120 and/or calibration scoring 130 may be implemented using code executed on one or more of the CPUs 806 and/or GPUs 808 and/or other processing circuitry.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
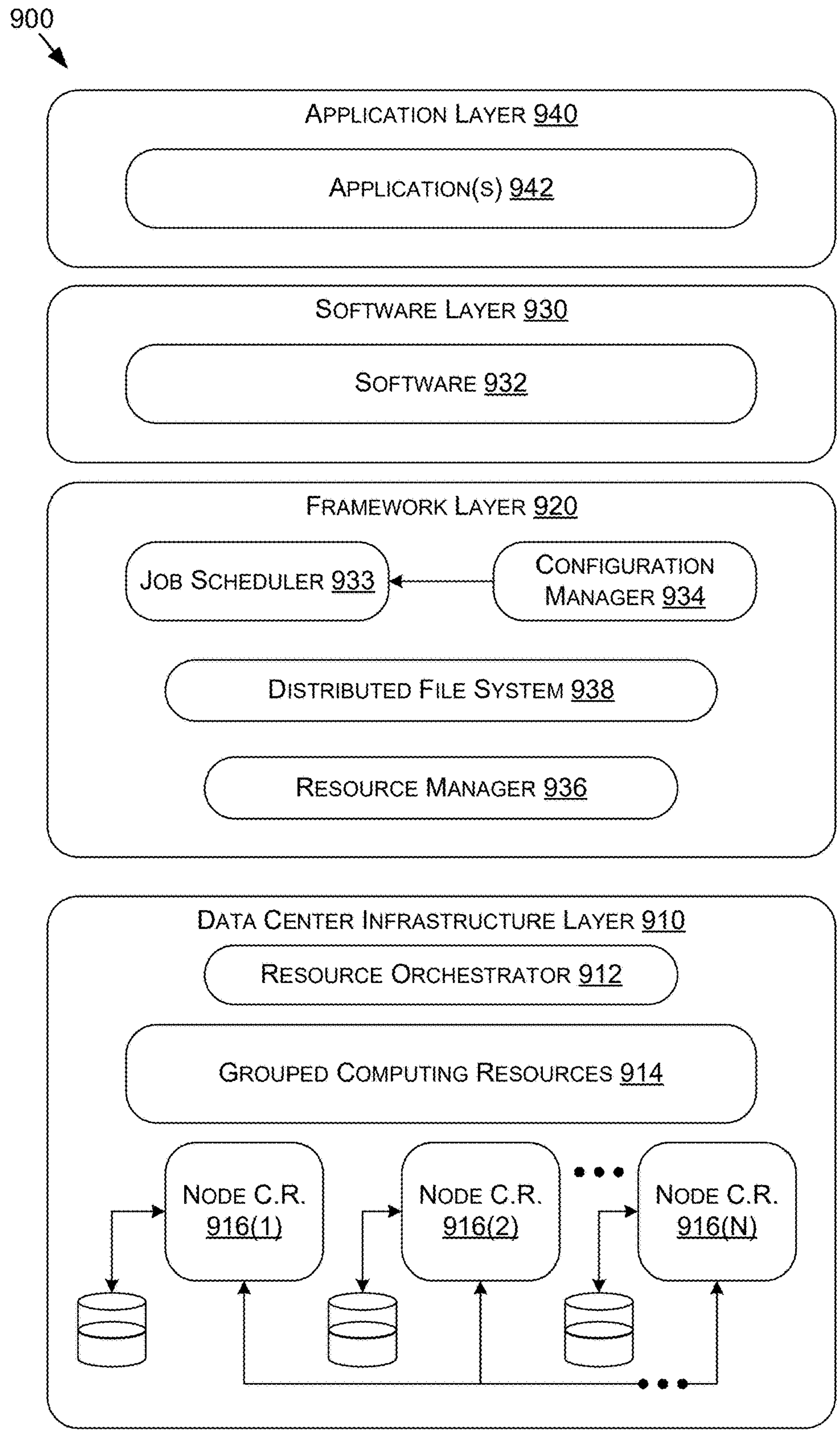
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof. In some embodiments, one or more of the functions described herein with respect to the calibration validation system 100, cross-camera view alignment 110, epipolar-based feature descriptor matching 120 and/or calibration scoring 130 may be implemented using code executed on one or more of the node C.R.s 916(1)-916(N) and/or grouped computing resources 914 and/or other processing circuitry.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:

detect a shared region appearing in one or more pairs of image frames from at least one pair of cameras having at least partially overlapping fields of view;

extract at least one pair of cross-camera view images comprising the shared region from the one or more pairs of image frames from at least one pair of cameras having at least partially overlapping fields of view;

associate at least one feature point of a feature detected from a first view image of the at least one pair of cross-camera view images with at least one matching feature point from a second view image of the at least one pair of cross-camera view images;

compute for the second view image at least one epipolar line based at least on a location of the at least one feature point within the first view image;

determine a calibration validation score for the at least one pair of cameras based at least on a deviation between a location of the at least one matching feature point and the at least one epipolar line; and generate an indication of whether a current calibration between the at least one pair of cameras is valid for continued use based at least on a determination of whether the calibration validation score satisfies a validation criteria.

2. The one or more processors of claim 1, wherein the one or more processors are further to:

associate the at least one feature point of the feature detected from the first view image with the at least one matching feature point from the second view image based at least on a vector representing at least one feature descriptor of the at least one feature point.

3. The one or more processors of claim 1, wherein the one or more processors are further to:

compute the at least one epipolar line based at least on one or more extrinsic camera calibration parameters associated with the at least one pair of cameras.

4. The one or more processors of claim 1, wherein the one or more processors are further to perform an operation comprising at least one of:

adjust one or more operations of an ego-machine based at least on the calibration validation score; and generate an output indicating at least when the calibration validation score does not satisfy a validation criteria.

5. The one or more processors of claim 1, wherein a first camera of the at least one pair of cameras captures a different angle of view than a second camera of the at least one pair of cameras.

6. The one or more processors of claim 1, wherein the one or more processors are further to:

process at least one of the first view image and the second view image to correct for one or more distortions to increase a similarity of appearance of one or more features between the first view image and the second view image.

7. The one or more processors of claim 1, wherein the one or more processors are further to:

aggregate a plurality of calibration validation scores for the at least one pair of cameras to produce a composite validation score based at least on a series of pairs of cross-camera view images captured over a span of time.

8. The one or more processors of claim 1, wherein the at least one pair of cameras comprises a plurality of camera pairs, wherein the one or more processors are further to:

isolate one or more calibration anomalies to at least a first camera of the at least one pair of cameras based at least on one or more calibration validation scores computed for diverse pairings of the plurality of camera pairs.

9. The one or more processors of claim 1, wherein the one or more processors are further to:

compute at least one sensitivity metric for the calibration validation score based at least on applying a range of perturbations to at least one extrinsic calibration parameter used to compute the at least one epipolar line; and output an indication of calibration validation score sensitivity based at least on the at least one sensitivity metric.

10. The one or more processors of claim 9, wherein the one or more processors are further to:

generate a validation score sensitivity map based at least on the at least one sensitivity metric computed by applying the range of perturbations; and determine the indication of calibration validation score sensitivity based at least on the validation score sensitivity map.

11. The one or more processors of claim 1, wherein the one or more processors are further to:

compute at least one sensitivity metric for the calibration validation score based at least on applying a range of perturbations to at least one extrinsic calibration parameter used to compute the at least one epipolar line;

generate validation score sensitivity data based at least on the at least one sensitivity metric computed by applying the range of perturbations; and predict a calibration validation classification for the at least one pair of cameras based at least on applying a machine learning classification model to at least the validation score sensitivity data.

12. The one or more processors of claim 1, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system for generating synthetic data;
a system for generating synthetic data using AI;
a system incorporating one or more virtual machines (VMs);
a system implemented at least partially in a data center; or
a system implemented at least partially using cloud computing resources.

13. A system comprising one or more processors to:
associate at least one feature point of a feature detected from a first view image with at least one matching feature point from a second view image, the first view image and the second view image being based at least on image data captured using at least one pair of cameras having at least partially overlapping fields of view, the first view image and the second view image comprising a shared region extracted from the image data;
compute at least one epipolar line for the second view image based at least on the at least one feature point within the first view image; and
output an indication of calibration validation for the at least one pair of cameras indicative of whether a current calibration between the at least one pair of cameras is valid for continued use based at least on a deviation between a location of the at least one matching feature point and the at least one epipolar line.

14. The system of claim 13, wherein the one or more processors are further to:
associate the at least one feature point of the feature detected from the first view image with the at least one matching feature point from the second view image based at least on a vector representing at least one feature descriptor of the at least one feature point.

15. The system of claim 13, wherein the one or more processors are further to:
compute the at least one epipolar line based at least on one or more extrinsic camera calibration parameters associated with the at least one pair of cameras.

16. The system of claim 13, wherein the one or more processors are further to:
process at least one of the first view image and the second view image to increase a similarity of appearance of one or more features between the first view image and the second view image.

17. The system of claim 13, wherein the one or more processors are further to:
compute at least one sensitivity metric for the indication of calibration validation based at least on applying a range of perturbations to at least one extrinsic calibration parameter used to compute the at least one epipolar line; and
output the indication of calibration validation based at least on the at least one sensitivity metric.

18. The system of claim 13, wherein the one or more processors are further to:
compute validation score sensitivity data for the indication of calibration validation based at least on applying a range of perturbations to at least one extrinsic calibration parameter used to compute the at least one epipolar line; and
compute the indication of calibration validation for the at least one pair of cameras based at least on applying a machine learning classification model to at least the validation score sensitivity data.

19. The system of claim 13, wherein the one or more processors are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for three-dimensional assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system for generating synthetic data;
a system for generating synthetic data using AI;
a system incorporating one or more virtual machines (VMs);
a system implemented at least partially in a data center; or
a system implemented at least partially using cloud computing resources.

20. A method comprising:
generating an indication of calibration validation for at least one pair of cameras indicative of whether a current calibration between the at least one pair of cameras is valid for continued use based at least on associating at least one feature point of a feature detected from a first view image with at least one matching feature point from a second view image and computing a deviation between a location of the at least one matching feature point and at least one epipolar line computed for the second view image based at least on the at least one feature point within the first view image, the at least one pair of cameras having at least partially overlapping fields of view, the first view image and the second view image comprising a shared region extracted from image data from the at least one pair of cameras.

* * * * *